2,980,225

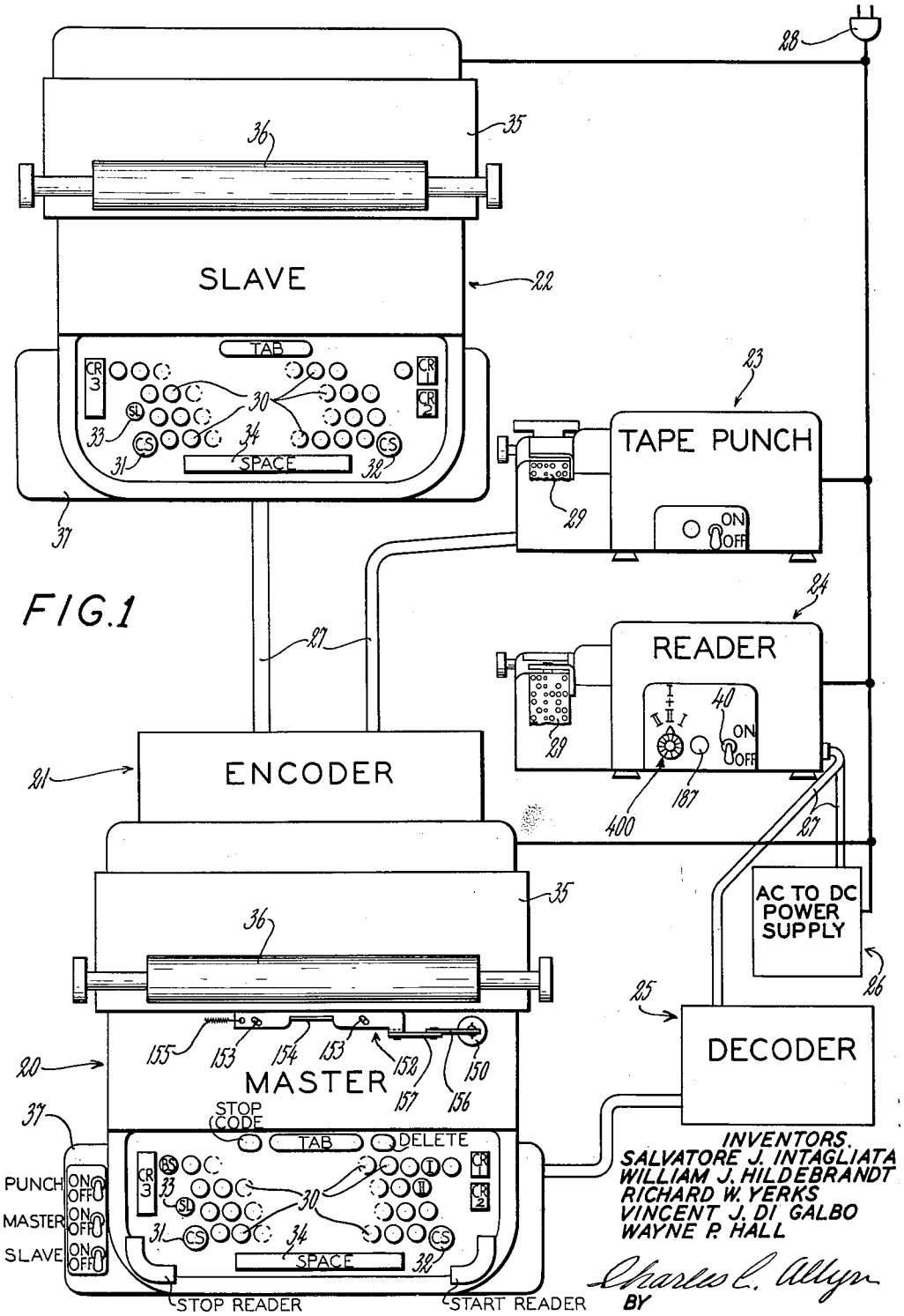

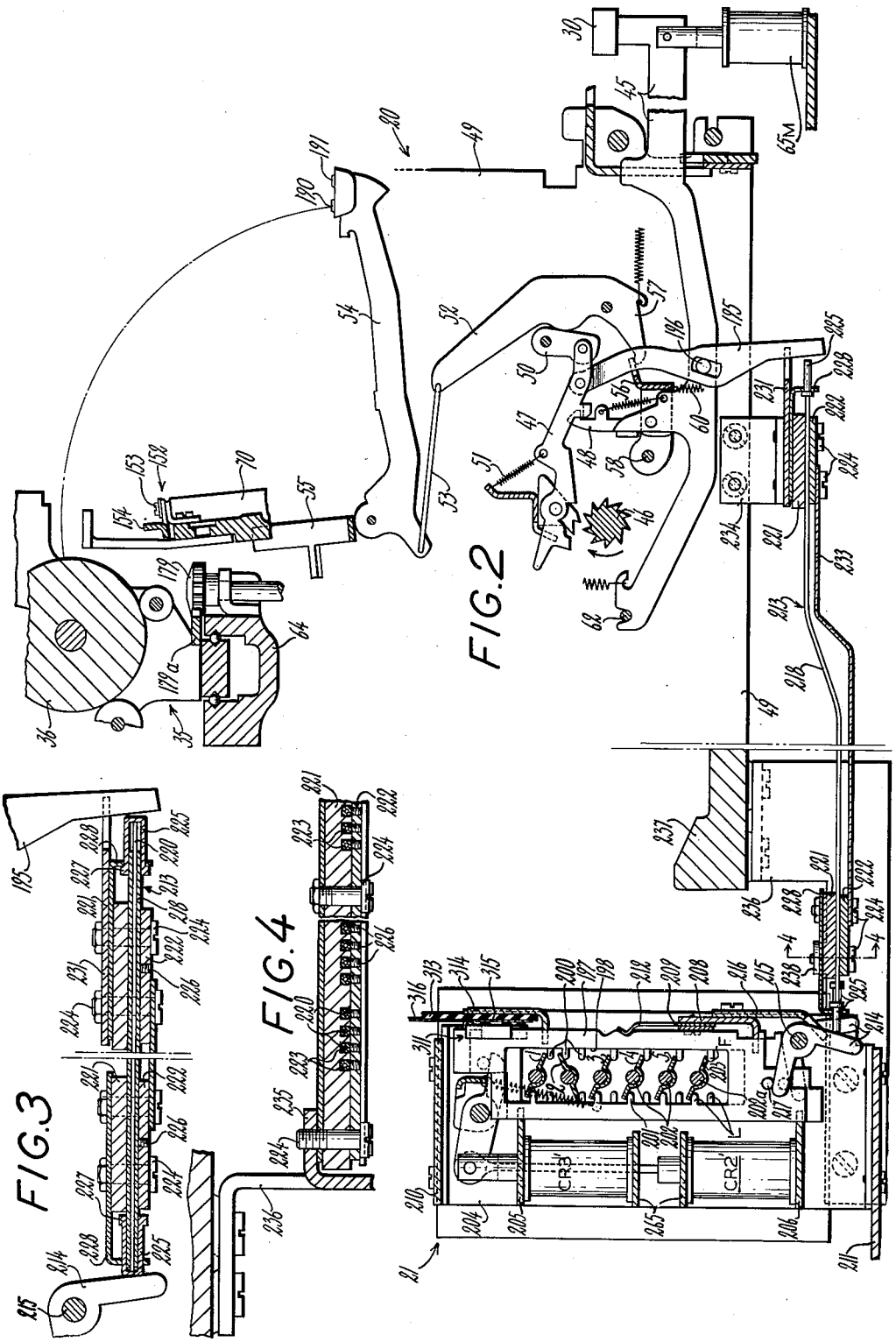

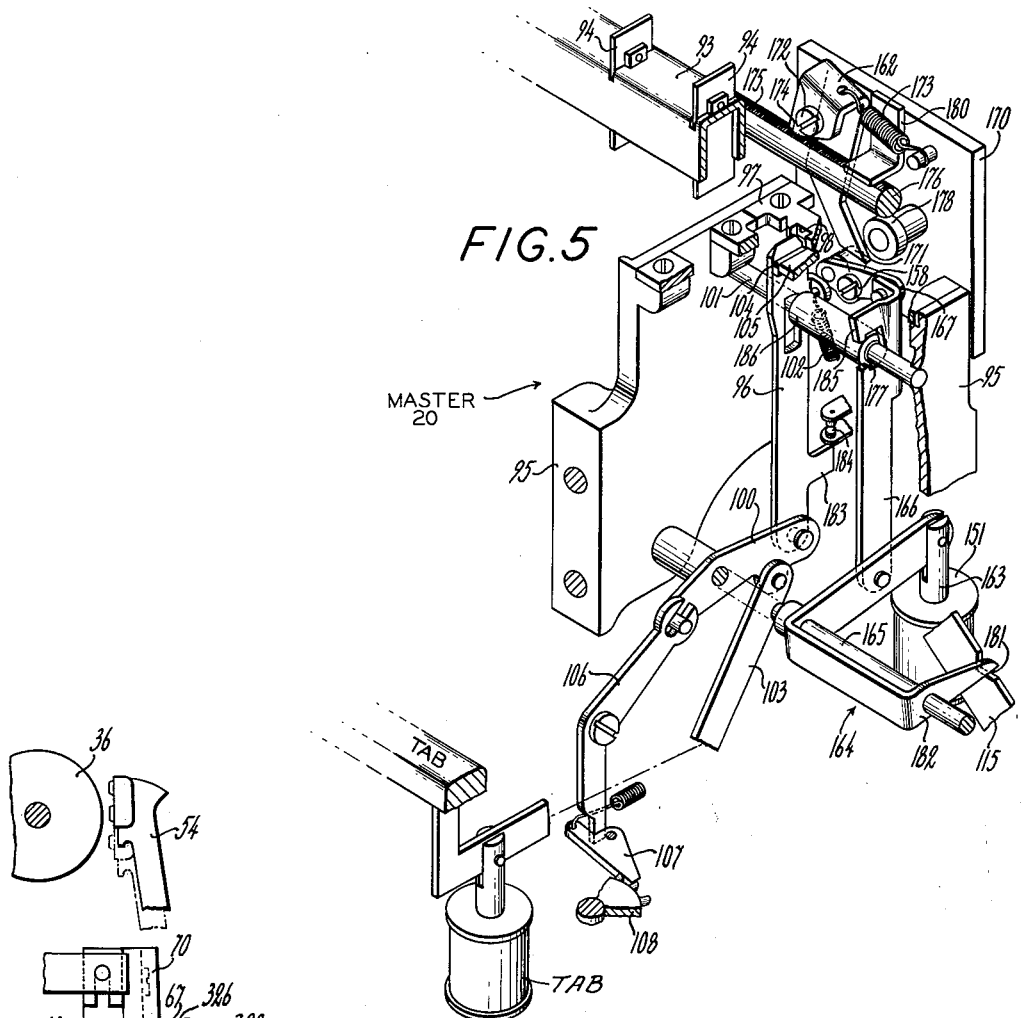
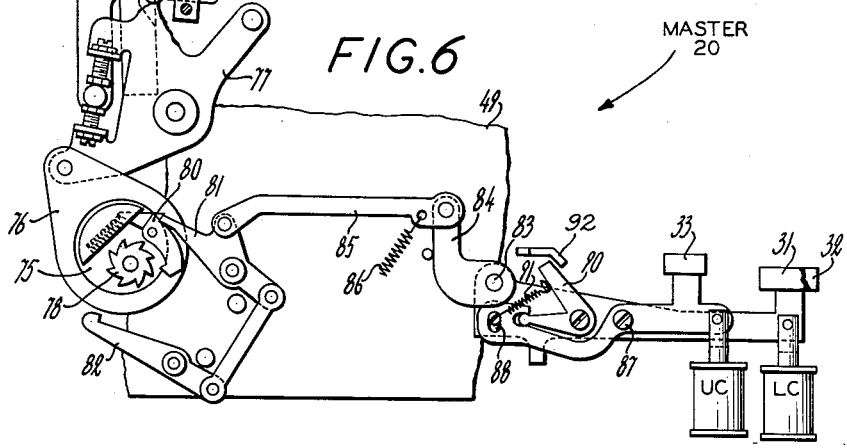

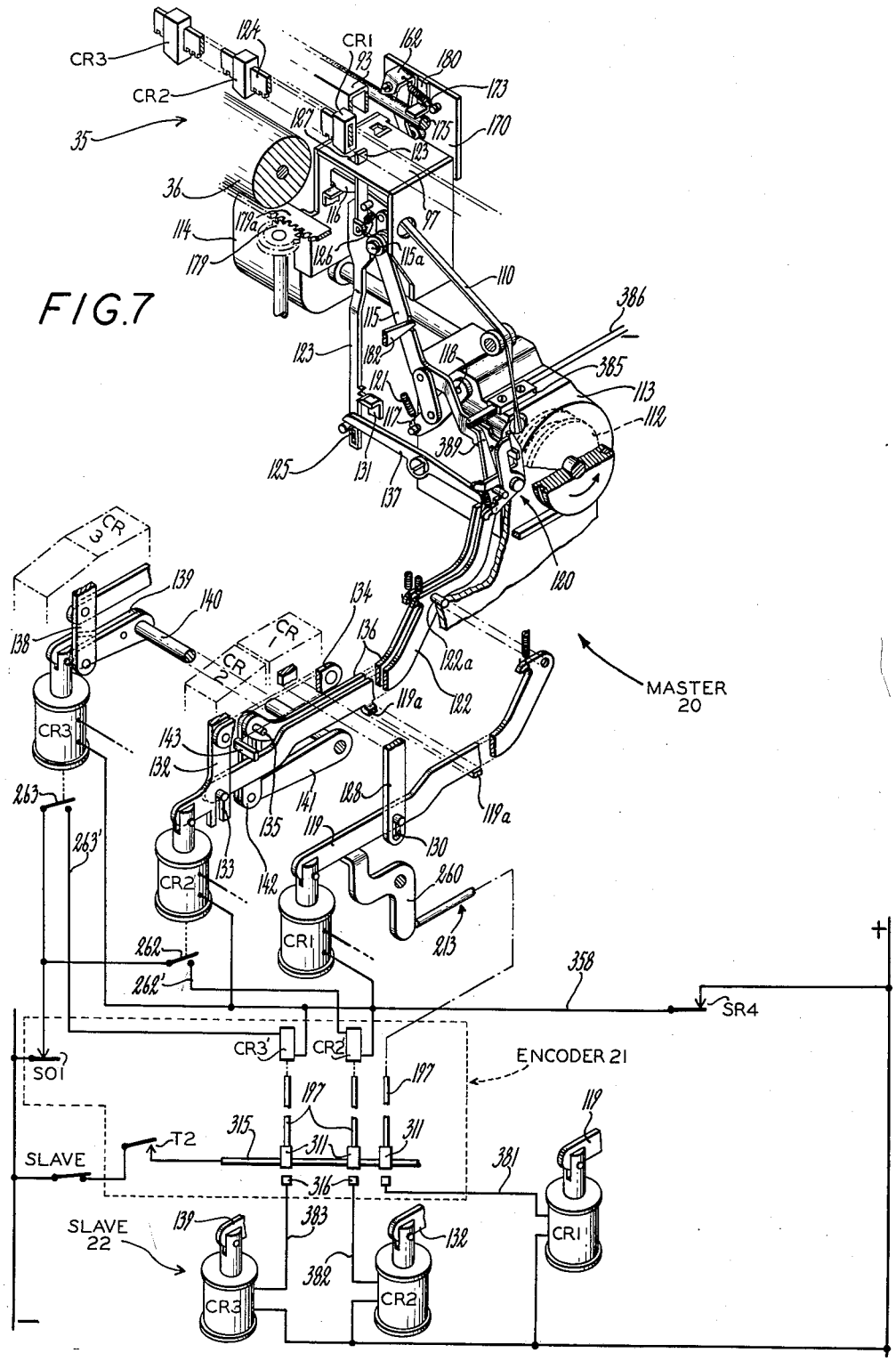

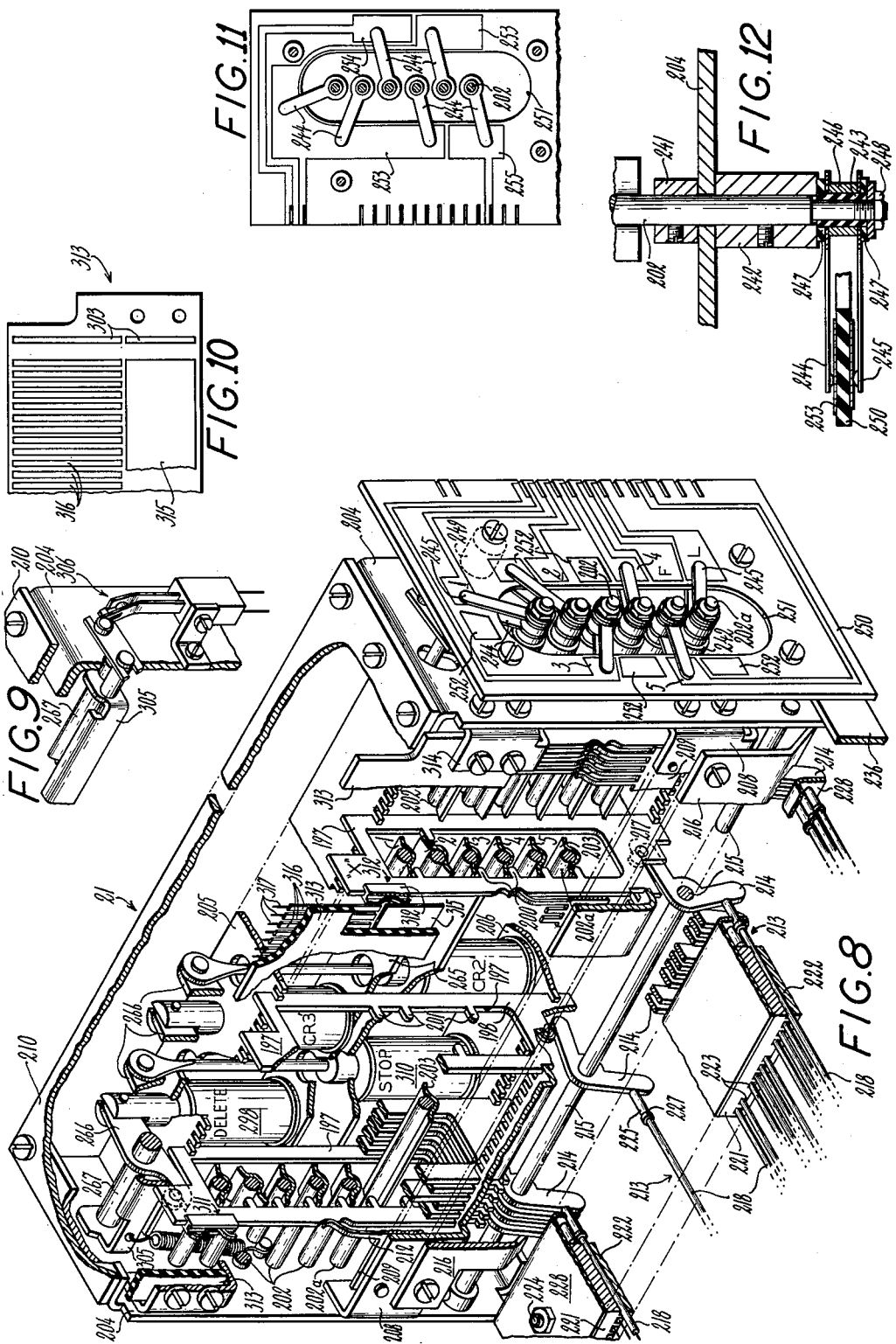

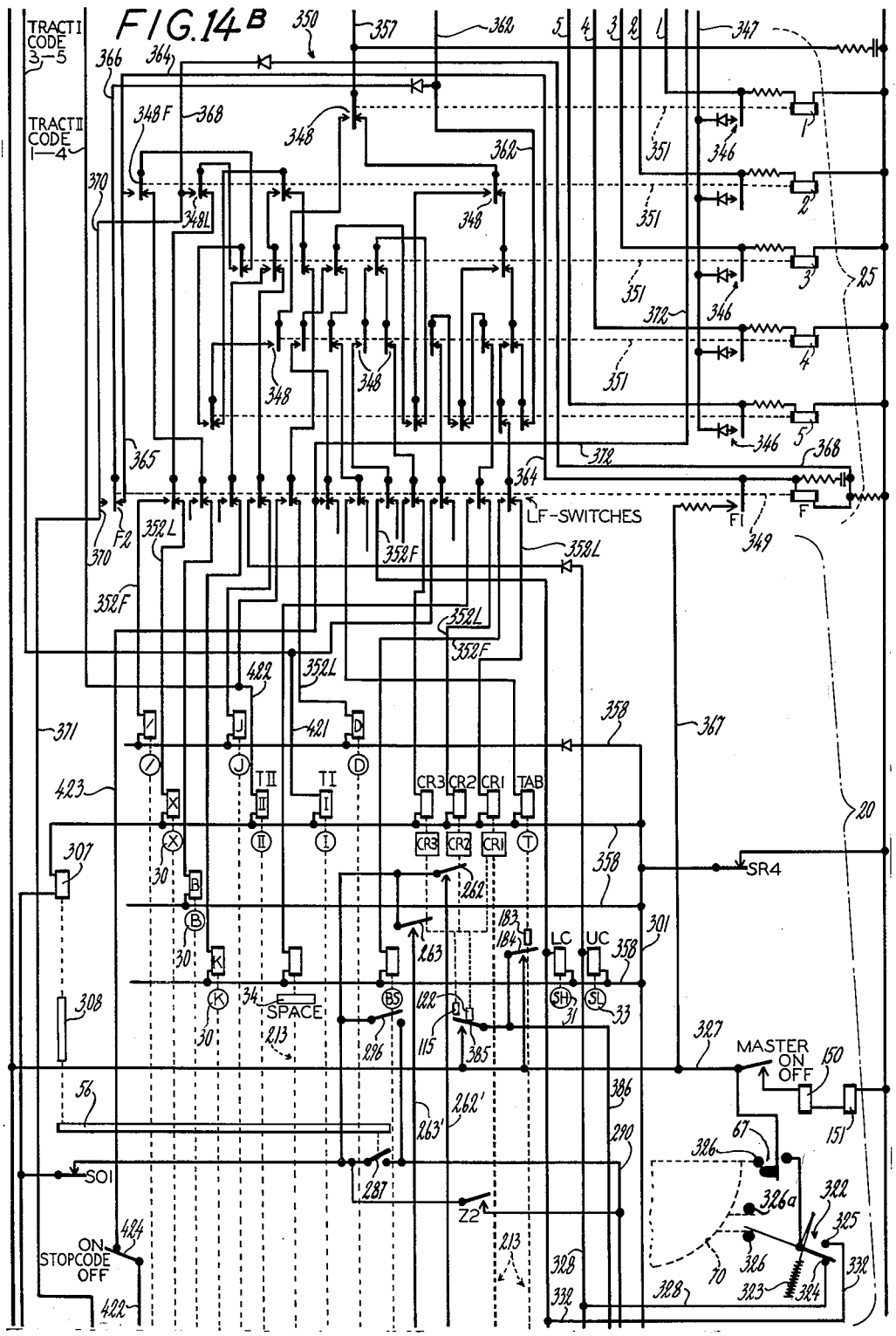

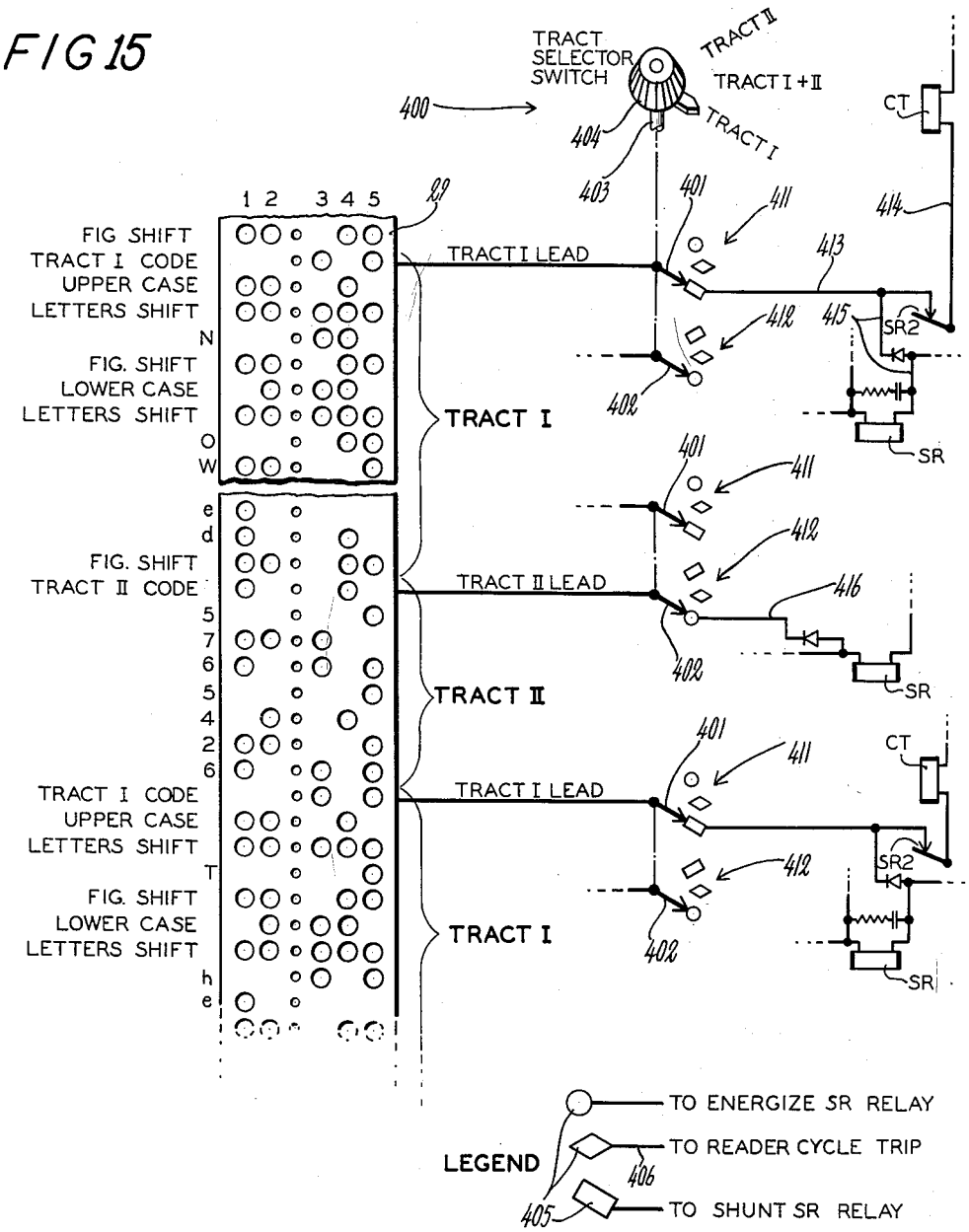

APPARATUS TO PRODUCE PRINTED AND CONTROL RECORDS AND TO UTILIZE THE LATTER FOR AUTOMATIC CONTROL PURPOSES

Salvatore J. Intagliata, Windsor, William J. Hildebrandt, Simsbury, Richard W. Yerks, Manchester, Vincent J. Di Galbo, Hartford, and Wayne P. Hall, New Britain, Conn., assignors to Underwood Corporation, New York, N.Y., a corporation of Delaware Filed Apr. 1, 1958, Ser. No. 725,637

27 Claims. (Cl. 197—1.6)

This invention relates in general to apparatus for printing or writing data and/or producing control records which are adapted to be utilized to control such or other apparatus automatically.

In the specific embodiment of the invention shown and described there are included two typewriters, a tape punch, an encoder whereby data fingered in a keyboard may be converted to combinational control signals for said tape punch, and a tape reader with an associated decoder which under control of a punched record tape are adapted to control either one or both of said typewriters, and/or the tape punch. Additional typewriters, tape punches and readers may be appropriately included in the system, or any useful combination of such machine units or general equivalents may be used together.

Generally speaking, apparatus of this nature is old and well-known. The invention pertains to various aspects of improvements which provide for greater efficiency of operation and increased flexibility and efficiency of use, and facilitate in an efficient manner the preparation of printed and control records of different format and different contents.

It may be said that an over-all object of the invention is to provide improved apparatus for production of printed and/or control media records.

One main improvement lies in the provision of a writer controlled mechanical encoder which affords a minimum of resistance to operation, is capable of fast performance, takes up and retains new settings in response to each operation of keys in a keyboard, such encoder controlling electric switches which constitute a coding memory which is drawn upon by the punch or equivalent device at appropriate times to produce a control record.

This mechanical encoder, according to one phase of the invention includes a means or element settable to one or another position in conjunction with certain coding operations to control efficiently as each new setting is imparted thereto, the interposition of a letters or a figures-shift signifying coding or punching operation ahead of an operation representative punching operation.

The encoder is largely of mechanical nature while efficient electromechanical means interpret the effected settings of the encoder to effect the combinational recordings, preceded whenever required by a letters-shift or a figures-shift signifying recording. An object of the invention is to provide devices for causing the efficient interposition of a letters or a figures punching operation whenever such an operation is required.

It is a further object of the invention to cause the punch, or equivalent, to give forth automatically a letters or a figures-shift signifying punching operation, each time such punch is preselected for use, thereby to assure that the produced record includes a proper figures or letters-shift representative recording in conjunction with the first effected data recording.

It is an object also to provide efficiently operative devices whereby either of the typewriters and/or the punch may be predeterminedly made responsive to the various control keys in the keyboard, such keys in the keyboard including one or more carriage positioning keys such as carriage return or tabulator keys.

Also an object of the invention is to provide by use of electrical switch means for the efficient mimicking of case-shift movements of one typewriter by the other, said switch means being controllingly tied up with the case shift bodies of both typewriters.

An object of the invention involving automatic operation of a plurality of writers automatically by record reader control, is to provide efficient devices whereby the reader after causing any institution of a carriage return in any writer will proceed to institute a next automatic operation only upon the conclusions of all instituted returns, the lengths of carriage returns in the various writers being independent in duration. Moreover, said devices are appropriately functioning in conjunction with different writer selections made.

An object also is to provide efficient equivalent means in connection with tabulating mechanisms in a plurality of writers whereby reader instituted tabulations in writers selected for operation will cause the reader to await the terminations of the effected tabulations before instituting a new operation.

According to a further feature of the invention, a control tape preferably includes certain control-tract identifying recordings at the start of each group of recordings making up a tract. Such tract-identifying recordings are produceable in the preparation of the control tape by the punch 23 under the control of special tract keys in the keyboard of the master writer and may be termed tract-start recordings.

It is a further object of the invention to provide a presettable means which efficiently in conjunction with tract-start recordings on a record tape facilitates the effective reading of given record tracts thereon for effective control of one or more writers 20, 22 and/or the punch, and which further facilitates automatic skip-reading of other record tracts on the record tape without resulting in any recording effects.

Many other features and objects of the invention will become apparent upon consideration of the detailed description which follows, as such description is read in the light of the drawings.

Referring to the drawings:

Figure 1 is a schematic showing of a series of machine units, some or all of which are involved in different phases of the invention.

Figure 2 is a left-hand sectional view of a master typewriter, an associated, improved encoding mechanism and Bowden wire connecting means therebetween.

Figure 3 is an enlarged view of the Bowden wire connecting means included in Figure 2.

Figure 4 is a rear sectional view through the rear portion of said Bowden wire connecting means.

Figure 5 is a front perspective view of a tabulating mechanism embodied in the master as well as in the slave, including an actuatable carriage holding device, the latter being only in the master.

Figure 6 is a left-hand fragmentary side view of a case-shift mechanism embodied in each of the typewriters, a switch 67, however, being only provided in the master.

Figure 7 is a right-hand front perspective view of a selective carriage return mechanism in the master and connecting means to operate a generally duplicate carriage return mechanism in the slave.

Figure 8 is a right-hand, fragmentary front perspective view of the stated encoder.

Figure 9 is a fragmentary perspective view showing a bail controlled switch embodied in the encoder.

Figure 10 shows a printed-circuit contact plate.

Figure 11 is a left-hand side elevation of a printed-circuit plate embodied in said encoder, along with associated switch fingers.

Figure 12 shows details of a coding switch and the manner of support.

Figure 14A:
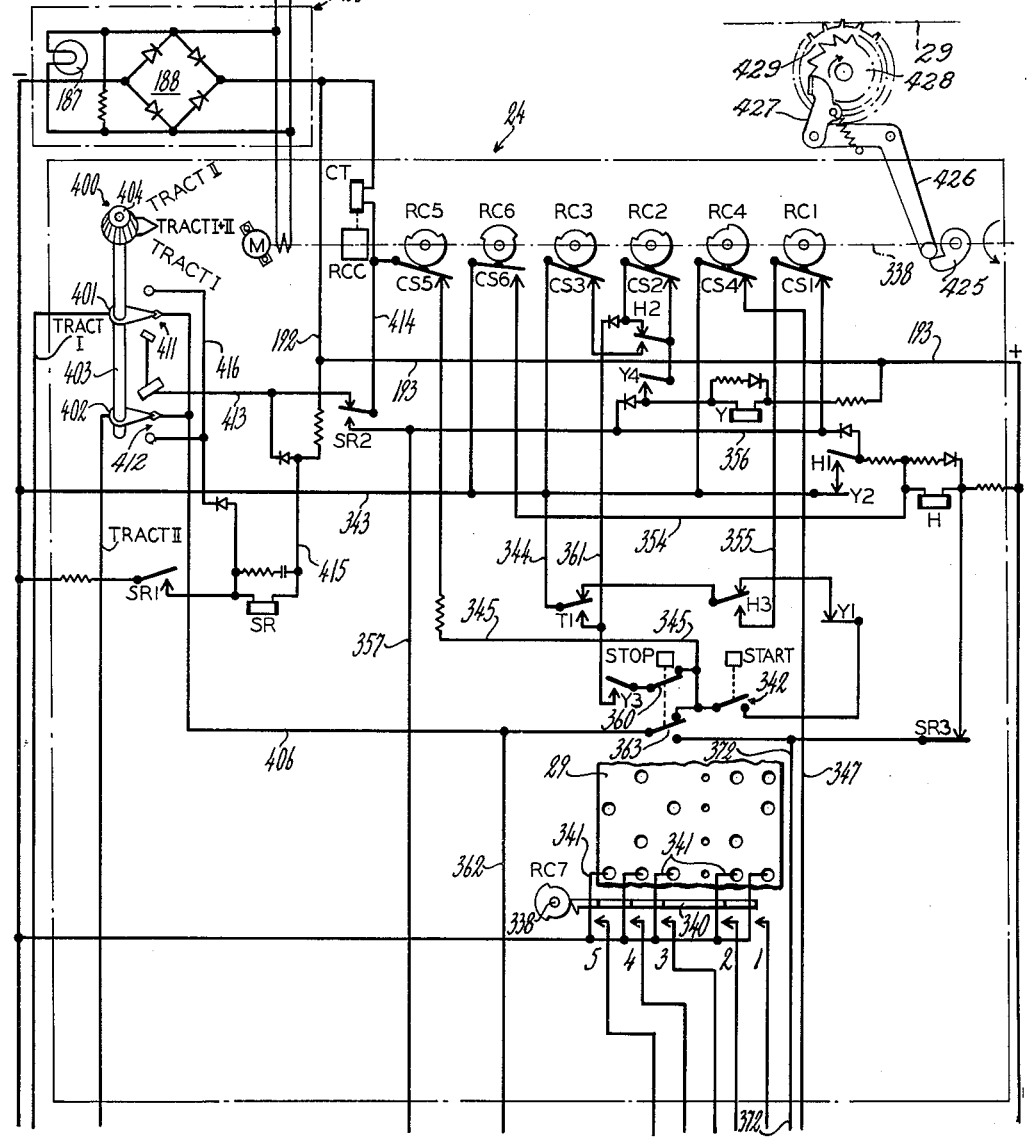
Figure 14C:
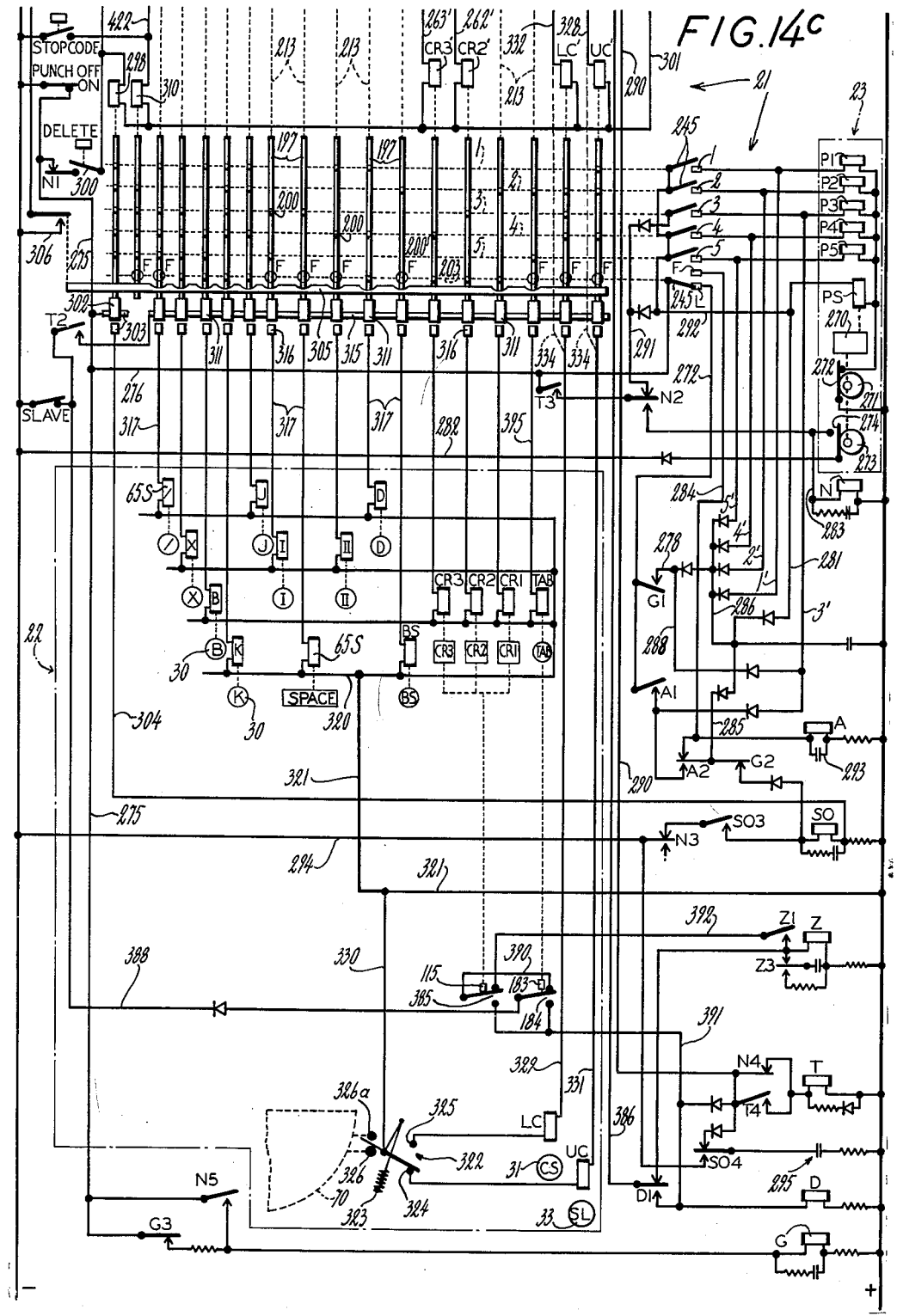

Figures 14a, 14b and 14c constitute together an electromechanical diagram of the interconnected apparatus seen in Figure 1.

Finally, Figure 15 is a diagrammatic representation of a device which is presettable to select certain record tracts for active record producing reading, unselected tracts being skip-read without record producing action.

The apparatus of the invention is hereinafter described in detail under the following sub-titles:

(1) General description of machine units
(2) Some details of the master and the slave writer
(3) Tabulating mechanisms in master and slave
(4) Selective carriage return mechanisms in master and slave
(5) Master writer incapacitation
(6) Baudot code adaptation in machine system
(7) Partial coding chart
(8) General electrical diagram
(9) Encoder 21
(10) Coding slide control by carriage return keys of master
(11) Tape punch—introduction
(12) Tape punch conditioning for operation
(13) Punching a letters-shift character if letters-shift condition has existed
(14) Punching a figures-shift character if letters-shift condition has existed
(15) Punching a figures-shift character if a figures-shift condition has existed
(16) Punching of letters-shift character if figures-shift condition has prevailed
(17) Word spacing, back spacing and representative coding
(18) Delete code punching
(19) Stop code punching
(20) Slave writer operation
(21) Synchronized case-shift of master and slave
(22) Tape reader and decoder and controlling effects therefrom
(23) Correlated carriage returns in the master and/or the slave, without representative punching
(23a) Carriage return operations in master and/or slave and carriage return signifying punching
(24) Reader-instituted carriage return operations and provision to delay the next reader-instituted operation pending carriage return conclusion or conclusions
(25) Reader-instituted carriage returns in master and/or slave with a return-signifying punching operation cycle
(26) Manually instituted carriage returns in master and/or slave with accompanying figures-shift as well as carriage return-signify punching cycle.
(27) Correlated tabulating in master and/or slave, with, or without representative punching
(28) Device to predetermine selectively transcriptive reading of select record tracts
(29) Conclusion

*(1) General description of machine units*

In Figure 1 there is shown schematically an organization of machines and units which variously figure in the invention. These units are, a master typewriter 20, an encoder 21 secured to the rear of the latter, a slave typewriter 22, a tape punch 23, a tape reader 24, a decoder 25 and an A.C.–D.C. power converter 26 which serves commonly the various units. The encoder 21 is of a new and advanced, efficient concept and, controlled by certain operations of the master typewriter keyboard, formulates combinational signals to control the tape punch 23 for effecting combinational recordings or perforations on a tape 29. Cables collectively identified by the numeral 27 variously interconnect the master 20, the slave 22, the tape punch 23, the tape reader 24, the decoder 25 and the power converter 26.

Each of the writers 20 and 22 embody a usual mechanism-driving motor, not shown, which requires A.C. power. Also the tape punch 23 and the tape reader 24 have A.C. motors therein for driving mechanism therein. An A.C. power supply for the several stated motors is represented by a plug 28 and has power lines reaching to various stated units 20, 22, 23, 24, and inclusive the A.C.–D.C. power converter 26. The power converter 26 supplies D.C. power to the various other stated units for such to perform their assigned functions, as all will become evident as this description proceeds.

The master typewriter 20 and the slave typewriter 22, include each a usual complement of type keys 30, and each such machine has a left and a right case-shift key, designated 31 and 32, respectively. There is also a case-shift lock key 33 in each of the machines. CR identifies on both typewriters 20 and 22, three carriage return keys which variously have markings "1," "2" and "3" signifying that they are effective to cause carriage returns to progressively farther points. Both the typewriters may have also a tabulator key marked "TAB" and a space bar 34. The two machines, 20 and 22, embody each a conventional paper supporting carriage 35 carrying a rotatable platen 36.

Three switches are mounted on the left end of a horizontal plate 37 underlying the keyboard of the master 20. One of such switches is a PUNCH switch and when moved to its "ON" position, the tape punch 23 will respond to the operations of the type and certain other keys in the keyboard of the master 20 to effect combinational recordings in the tape 29 representative of such key operations. In the "OFF" position of the PUNCH switch the tape punch 23 will be idle, that is unresponsive to the keys of the master.

The SLAVE switch when placed in its "ON" position interconnects functionally the slave 22 with the master 20 so that it will mimic substantially all its operations. In the "OFF" position of this switch the slave is disconnected. The switch denoted MASTER, in its "ON" position will cause the master 20 to typewrite and execute carriage movements, in a usual manner, responsive to the operations of its various control keys. In the "OFF" position the said MASTER switch has a controlling effect so that the master typewriter 20 is not effectively controllable by its keys to produce the operations which they normally produce. Nevertheless the same keys will be controlling with respect to the slave 22 and the punch 23, providing their related control switches are in their "ON" positions.

The tape reader 24 has a switch 40 whereby it is adapted to be conditioned to control the keys of the master 20 in accord with operations represented by perforations on a perforated record tape 29 loaded in the said reader. When the reader has been so conditioned, a START READER key in the keyboard of the master 20, whenever actuated will start the operation of the reader and a STOP READER key in the same keyboard will stop the reading operation. It is to be understood that whenever the keys of the master writer 20 function under the control of the tape reader 24, the positions of the designated PUNCH, MASTER and SLAVE switches are determining which of the units 20, 22 and 23 will perform to give recording service.

*(2) Some details of the master and the slave writer*

The master writer 20 and the slave writer 22 are almost entirely of identical construction and the same as the regularly manufactured Underwood All Electric typewriter. Differences and additions of each over said regularly manufactured typewriter will be brought out. Figure 2, which is a left-hand sectional side view of the master 20, shows one of a system of type actions and its operative connection with the encoder 21. The type actions in the slave 22 are the same as in the master 20. Thus a description of the type action shown in Figure 2 will suffice. Type key levers 45 are arranged alongside of each other between typewriter side walls 49. Each such lever bears one of the aforementioned type keys 30. There is in the master 20 and in the slave 22 a toothed power roll 46 which is continuously driven in the direction of the arrow when the motor therefor is connected to the A.C. power source seen in Figure 1 and represented by the plug 28. By selective operations of the key levers 45, hooks 48 on the latter draw down conventional power actuators 47 into motion-receiving relation with the toothed power roll 46 to receive type action operating strokes. The actuators 47 are pivotally carried upon pendant arms 50 and are biased by springs 51 to restore rearwardly and upwardly to lie normally clear of the power roll 46. Upon being brought into motion-receiving relation with the power roll, each actuator 47 through its associated pendant arm 50, operates a sublever 52 which by a pull link 53 has connection with a type bar 54, thereby operating the latter against the platen 36. The type bars 54 are arranged in a usual arcuate array and in each machine are operative upon a curved universal bar 55 which is in control of a usual carriage escapement, a fraction of which is indicated in Figure 5. The master 20, as also the slave, has a universal bar 56 extending transversely of the machine and operable by downreaching tongues 57 of the sublevers 52. The universal bar 56 has a pivot axis 58 and a restoring spring 60. It serves to operate a usual ribbon vibrator, not shown. The key levers 45 are pivoted at their rear ends, as at 62, and are spring-urged upwardly in a usual way. The side walls 49 are part of a mechanism supporting frame which also includes a guideway 64 for the carriage indicated at 35. The slave has a similar frame. The type key levers 45 in the master 20 are operable by individual solenoids 65M and identical solenoids 65S, see Figure 14c, are provided to operate the key levers of the slave.

The structure of case-shift mechanism in the master 20 and the slave 22 is substantially that shown in the patent to Helmond 2,275,759, dated March 10, 1942. Figure 6 depicts such case-shift mechanism along with a switch 67 which is only provided in the master 20. At 68 there is indicated a case-shift body which supports a type bar segment 70. The body 68, along with its segment 70, is shown in its lower case position. When an eccentric 75 is given a clockwise half turn it will by means of a connecting rod 76 draw the body 68 down to its upper case position, said connecting rod doing this by a usual rocker 77. The eccentric 75 stands normally still but is transitorily connectable to a toothed element 78 which turns constantly with the power roll 46. A pawl 80 which is carried on the eccentric 75 and spring-urged toward the element 78, is normally held in a disengaged relation from the latter by encounter with a dog 81. The dog 81 has a link connection with another dog 82. To effect a case-shift movement of the segment 70 downwardly, the dog 81 is rocked clockwise so that the pawl 80 springs into motion-receiving engagement with the toothed element 78. The other dog 82 concomitantly takes up a position to intercept the pawl 80 following a half revolution of the eccentric 75, at which time the connecting rod 76, through the rocker 77, will have power-moved the segment 70 downwardly to its upper case position. Reverse movement to lower case position ensues upon the restoration of the dogs 81, 82, because the eccentric 75 then is given another half turn and at the end of which it is intercepted in normal position by the dog 81. The left and right case-shift keys 31 and 32 are borne respectively on opposite ends of a shaft 83 which is pivotally carried in the opposite walls 49 of the machine. At the left end the shaft 83 has an arm 84 connected by a link 85 to the dog 81. A spring 86 has a bias on the link 85 to restore the case-shift levers 31 and 32 upwardly to their normal positions. Depression of either of the case-shift keys 31 or 32, by the control of the dogs 81, 82, will cause a power case shift of the type bar segment 70 downwardly to upper case position. Conversely, release of either of these keys will cause a power movement of the segment again to normal case position. The case-shift lock key 33 is used when a plurality of successive upper case impressions are to be made. It is pivotally carried at 87 on the left-hand case-shift key 31 and its motion thereon is limited by a pin and slot association at 88. A pawl 90 is interconnected with the case-shift lock key 33 and also carried on the shift key 31. A spring 91 has a counterclockwise urge on the pawl 90 and in turn on the lock key. Initial downward pressure on the lock key 33 will first pivot the pawl 90 clockwise on the case-shift key 31 until the pawl meets the underside of a frame supported lug 92. Thereupon the lock key 33 will move the case-shift key 31 along with it downwardly to cause a power case shift. Finally as the pawl 90 passes the end of the lug 92 it will spring upwardly in front of the lug 92. Therefore, upon release of pressure on the lock key 33, the case-shift lever 31 remains operated. Power movement of the segment to lower case position follows upon application of effected transitory pressure on either of the case-shift keys 31 or 32. This causes the pawl 90 to snap free of the lug 92 so that a case-shift key restoration follows with a consequent restoration of the dogs 81, 82 and a power shift of the segment 70 upwardly to lower case position.

(3) Tabulating mechanisms in master and slave

The master 20 and the slave 22 embody each a tabulating mechanism generally as fully described in the patent to Helmond 2,303,878, dated December 1, 1942. A portion of such mechanism more particularly related to the invention will now be described in connection with Figure 5, such figure showing also some added mechanism which is only provided on the master 20. Both the master and the slave include on their carriages 35 a usual tabulator stop rack 93 which has tabulating stops 94 provided thereon at select points. Below said rack 93 the master and slave have each a usual narrow housing 95 forming part of the framework of the machine. A tabulator reed 96 reaches from within said housing 95 upwardly through an opening 98 in a top plate 97. The lower end of the reed 96 has pivotal connection with a lever 100 and near the upper end it is slotted for guidance on a rod 101. A spring 102 connected to an ear of the reed 96 has a downward and a rightward bias so that the reed normally occupies a lowered position out of cooperative range with the tabulator stops 94. The TAB key (tabulator) in each machine, by calling into operation a power mechanism, not shown, but fully disclosed in said patent to Helmond 2,303,878, will through a link 103 project the reed 96 upwardly into tabulation terminating range of said stops 94. When the reed becomes projected, its upper end, under the rightward urge of the spring 102, will swing rightwardly for the shoulder 104 thereon to catch over a ledge 105. During the same operation a lever 106 will free an escapement dog 107 from an escapement wheel 108, the carriage then being drawn leftwardly by a usual carriage feed spring, not shown. The carriage thus will execute a tabulating run which is terminated by a tabulator stop 94 running leftwardly against the upper end of the reed 96. In doing so the reed is moved in the opening 98 leftwardly to the limit of the latter. The shoulder 104 moving free of the ledge 105, causes the tabulator reed 96 to restore, and concomitantly the escapement dog 107 will reassume control over the escapement wheel and thus the carriage.

The reed 96 on each writer 20 and 22 has a nose 183 which upon its operation will close a switch 184. The purpose of each of these switches will be later set forth.

(4) Selective carriage return mechanisms in master and slave

The master 20 and the slave 22, embody each a three-key selective carriage return mechanism which is substantially the same as in some of the marketed Underwood All Electric typewriters. Such a mechanism is briefly described in application Serial No. 642,279, filed by Hildebrandt and Intagliata, February 25, 1957. The mechanism includes the three carriage return keys CR which have been mentioned already in connection with Figure 1. Figure 7 shows the selective carriage return mechanism on the master 20, the three carriage return keys CR1, CR2, CR3 are indicated in dot-and-dash lines. All carriage returns are effected through the medium of a usual carriage return drawband 110. The left end of such drawband is operatively connected with a usual line spacing mechanism, not shown, and its right end is always wound taut upon a drum 112 under the tension of a very light spring which also is not shown. The said drum 112, as well as a normally open carriage return clutch, not shown, is contained within a housing 113. The driver part of said clutch is constantly driven by an electric motor 114 through a speed reduction drive also contained in said housing 113 but not shown. The stated carriage return clutch is adapted to be closed through a counterclockwise displacement of a lever 115 from the Figure 7 position, such lever being pivoted at 115a. A carriage return control lever or arm 117 pivoted at 118, has a link connection with said lever 115. A conventional latch device 120 holds said control lever 115 normally down at its right end, in a carriage return shut-off position and against the tension of a spring 121. Closure of the carriage return clutch follows through the urge of said spring 121 whenever the latch device 120 is actuated through a lever 122 which pivots on a rod 122a. The control lever 117 then swings clockwise to a closed clutch position. The drum 112 then winds the drawband and operates first the aforementioned line spacing mechanism and then imparts returning movement to the carriage. The extent of the so effected power return of the carriage is predetermined through selection of one of three carriage return stops CR1, CR2 and CR3 for cooperation with a counterstop arm 123. The stated carriage return stops are adjustably carried on a rack bar 124 of the carriage and are of slightly different form, the stop CR1 having the shortest downward reach and the other two stops having a progressively longer downward reach. The counterstop arm 123 is generally upright and has a pin and slot association with the frame, as at 125. It is urged upwardly by a spring 126 so that it stands lifted normally to the limit of said slot association 125 for its upper end to stand in the range of the stop CR1 which reaches down to the least extent. Said spring 126 has a bias action to also urge the counterstop arm 123 rightwardly within a limiting opening 127 provided in the top plate 97 of the housing.

A carriage return key CR1 has a stem 128 which has a pin and slot connection 130 whereby it is adapted to operate a lever 119 which overlies a lug 119a on the lever 122. For purposes of illustration the lever 119, as well as a portion of the stem 128, is shown at a distance rightwardly of the true position which is directly adjacent to the lever 122. Thus, when the lever 119 is operated, it releases the latch device 120 and thereby will cause a clutch closing operation of the lever 117. At such time the upper end of the lever 115 operates an element 116 leftwardly and by a pin, displaces the upper end of the counterstop 123 slightly leftwardly. In the carriage return which now is under way, the carriage return terminating stop CR1 will eventually strike and displace the counterstop 123 to the right, displacing it limitedly within the opening 127. This, through the element 116, will effect a restoration of the lever 115 to the latch device 120, whereby the carriage return drive mechanism is rendered inactive. During the return the escapement wheel 108 of Figure 5 rotates idly, the escapement dog 107 being in control over the wheel at the end of each carriage return.

The operations of the CR2 and CR3 keys will each also result in an operation of the lever 122 and thus a tripping operation of the latch device 120 to bring into action the power carriage return mechanism. The depression of the CR2 key moreover will lower the counterstop arm 123 a little to bring it into cooperative range with the CR2 stop, whereas the depression of the CR3 carriage return key will lower said counterstop arm 123 a little more to bring it into cooperative range with the CR3 stop. When so lowered to the varying degrees stated, the counterstop 123 is detained automatically by a dog 131 against upward movement. The CR2 key has a stem 132 which near its lower end has a pin and slot association at 133 with the lever 122 for operating it. Near the upper end the key stem 132 is guided by a pivoted arm 134 which overlies a pin 135 of a lever 136, the rear end of which lever is associated with a lever 137 to rock it and thereby to impart a downward movement to the counterstop arm 123. The downward motion of the arm 134, in a manner not shown, is limited so that the counterstop arm will be lowered out of the range of the CR1 stop and into the range of the CR2 stop. The carriage return key CR3, which is at the left end of the keyboard, surmounts a stem 138 on an arm 139 of a bail 140 and when depressed will actuate the latter. The bail 140 includes at the right end of the keyboard an arm 141 having thereon an upreaching link 142. A laterally offset ear 143 on the link 142 overlies the lever 122 to operate the same for carriage return instituting action. At the upper end, said link 142 has a one-way acting connection with a leftwardly extending portion of the pin 135, so that when the CR3 key is operated the lever 136 receives an appropriate motion to lower the counterstop arm 123 to stand in the range of the carriage return terminating stop CR3. Of course, the motion impartable to the bail 140 is appropriately limited and, moreover, the dog 131 will detain the counterstop arm 123 in the appropriately lowered position. The carriage return runs instituted under control of the CR2 and CR3 keys are thus respectively terminated by the CR2 and CR3 stops engaging the counterstop 123. As in the case of a carriage return effected under control of the CR1 key, there occurs a rightward displacement of the counterstop arm 123 which will restore the control lever 117 so that it will be held by the latch device 120 in open clutch position. Moreover, in a usual manner, the control lever 117 in being restored will automatically release the dog 131 so that the counterstop 123 under the urge of the spring 126 will automatically move upwardly to its normal position.

(5) *Master writer incapacitation*

The master writer 20 may be conditioned at will so that the operations of its type keys 30, the tabulator key, the carriage return keys, the space and back space keys will be ineffectual to produce in the master effectively their designated operations. However, when the master is so conditioned it will not deprive these keys of their controlling effect with respect to the slave writer 22 or the tape punch 23. The aforementioned switch designated MASTER facilitates such conditioning. This switch, whenever placed in the "OFF" position, will close a circuit for two solenoids 150, 151, seen respectively in Figures 1 and 5. In the "ON" position of such switch both these solenoids are in a deenergizing condition. Thus it will be noted that the "ON" and "OFF" designations denote respectively that the master 20 is conditioned for effective response or non-response to the stated keys therein, and do not denote the circuit controlling state of the MASTER switch. The solenoid 150, see Figure 1, controls the position of a horizontal slide 152 provided somewhat below the printing point of the master 20. Such slide is substantially the same as disclosed in an application of Hildebrandt, Serial No. 661,427, filed May 24, 1957. It has pin and slot provisions at 153 whereby it is carried upon the type bar segment 70 for diagonal movement from the idle rearward position in Figure 1 to a more forward position wherein a front face 154 is in position to block the terminal movement of the type bars 54 toward the platen 36. The idle position of the slide 152 prevails normally under the influence of a spring 155. At operation of the MASTER switch to its "OFF" position the solenoid 150 becomes energized and by operating a bell crank 156, acts through a link 157 to draw the slide rightwardly to its type bar blocking position.

The invention provides that for the duration in which said MASTER switch is in the "OFF" position and thus the type and certain other keys are non-controlling with respect to the master 20, the carriage 35 of the master writer 20 will stand or be held stationary. Thus, the space key, the back space key, the tabulator key and the three carriage return keys CR in the master, although operable, are then incapable of instituting movements of the carriage 35 of the master writer 20. However, as will be realized later herein, operations of the tabulator and the carriage return keys of the master may nevertheless have controlling effect with respect to the slave writer 22 and the tape punch 23.

The operation of the aforestated solenoid 151 concomitantly with the solenoid 150, will cause a clamp element 162, see Figure 5, to hold the carriage 35 of the master. Additionally it will cause the blocking of the carriage return clutch in its open position and will prevent the latching of the tabulator reed 96, if operated, in operated position. The said solenoid 151 has an armature plunger 163 depending from one arm of a bail 164 which is pivotally provided on a rod 165 that also supports the lever 100. Reaching upwardly from the said arm of the bail 164 is a link 166 having at its upper end an articulation with a lever 167 which is pivoted on a stud 168 having support in a vertical plate 170 secured to the housing 95. Said lever 167 carriers at its left end a roller for camming contact with the lower end of an arm 171 forming part of the clamp element 162. The clamp element 162 pivots on a stud 172 that is fast on the plate 170. A spring 173 exerts a clockwise urge on the clamp element 162, so that teeth 174 on the latter stand normally clear of a row of teeth 175 provided along the upper side of a carriage-carried bar 176. The normally prevalent position of the clamp element 162 is established by the lower end of a slot 177 in the link 166 abutting upwardly against the rod 101, said slot straddling said rod loosely. The bar 176 extends along the full length of the carriage and runs guided on a roll 178 which is turnably carried on the plate 170. A usual element 180 supported on the plate 170, overlies with slight clearance the top surface of the bar 176, thereby to prevent excessive upward dislodgement. It will be seen that operation of the solenoid 151 moves the clamp element 162 counterclockwise. In doing so the teeth 174 thereon will engage the teeth 175 on the bar 176 to hold the carriage 35 stationary. Incidental to such action the teeth 174 will swing slightly to the right and will impart a slight rightward movement to the carriage. Such movement, through the usual geared connection, comprising a pinion 179 and a rack 179a, Figure 7, which the escapement wheel 108 has with the carriage, will turn the escapement wheel 108 slightly clockwise, so that a small gap is established between the right end of the dog 107 and the adjacent tooth of the escapement wheel. The establishment of said slight gap will assure that whenever the solenoid 151 becomes relaxed after an idle operation of the tabulating mechanism, the escapement dog 107 will appropriately reassume control over the carriage in the same letter feed position it occupied before.

The bail 164 has a short arm 182 at its right normally overlying with some clearance, as at 181, the clutch controlling arm 115. Resultant to the operation of the solenoid 151, this arm 182 will swing downwardly and finally will contact and slightly depress the arm 115 and hold it there. Therefore, in the "OFF" position of the MASTER switch, the tripping of the usual latch device 120, Figure 7, by any of the carriage return keys CR in the master writer 20 will fail to produce a clutch closing movement of the arm 115 because it is held, wherefore the carriage return keys, if operated, are inffectual with respect to the carriage.

Assuming that the MASTER switch is in the "OFF" position and thus the carriage 35 is held by the clamp element 162, the operation of the tabulating key on the master will cause an idle transitory projection of the tabulator reed 96 along with a temporary operation of the escapement dog 107 free of the teeth of escapement wheel 108. However, immediately an automatic restoration of the tabulator reed 96 and the dog 107 follows. To this end, the link 166 has a camming formation 185 which incidental to the operation of the solenoid 151 is leftwardly active on a sleeve 186 provided on the rod 101. The sleeve 186, by being cammed leftwardly will push the upper end of the tabulator reed 96 slightly leftwardly of the Figure 5 position and will maintain it there. Therefore, in the event the tabulator key in the master is operated, the reed 96 in such machine becomes projected but the shoulder 104 thereon will be unable to catch rightwardly over the ledge 105. This provides that the tabulator reed will automatically restore independently of any tabulating movement of the carriage as soon as the operating force on its actuating link 103 is removed. The tabulating mechanism in both the master 20 and the slave 22 may be of the power-actuatable kind disclosed in the patent to Helmond 2,303,878, dated December 1, 1942, to which reference may be had. The tabulator reed has a guide slot therein straddling the rod 101 and providing a normal limiting stop.

*(6) Baudot code adaptation in machine system*

Each of the typewriters 20 and 22 of the machine system seen in Figure 1 is of generally standard construction and includes a four-bank character keyboard. Each type key 30 is adapted to call into operation one specific type bar 54 having one lower-case type 190 and one upper-case type 191, either the upper-case or the lower-case type printing depending on the case position which is predeterminedly given to the case-shift segment 70 by the aforedescribed case-shift mechanism comprising the eccentric 75.

The operations of the type keys 30 of the master 20 through the intermediary of the encoder 21, are adapted to control the tape punch 23 so that the latter will produce a perforated record on a tape 29 of the data which is typed on the master 20 or the slave 22. Such record tape 29 may subsequently serve for automatically controlling various apparatus. It may be used to control a typewriter, such as the master 20 or the slave 22, or both, in which case it is placed in the tape reader 24 and acts controllingly on such typewriters through intermediary of the decoder 25. Certain runs or portions of data recorded on the tape and consisting principally of numerical data, may serve to control automatically an adding or other numeral processing machine. Preferably and very importantly, the encoder 21 and the tape punch 23 are devised generally in conformance with a Baudot five-position code, so that the record tape 29 produced will be suitable to control automatically substantially conventional telegraph transmitter apparatus which at a distant location causes a conventional telegraph receiver typewriter to record the data.

The five-position Baudot code embodies thirty-one possible punching combinations, but telegraph typing machines embody nearly double this number of types therein. Conventionally these telegraph typewriters have no lower-case alphabet types. They have only a set of upper-case alphabet types which in a letters-shift position of the machine by type keys or like elements are individually selectable for typing, and have further numeral and special-sign types which in a figures-shift position of the machine, by the same key elements, are individually selectable for typing.

Conventionally, in accord with said Baudot system or code, a hole or notation in all of the five code positions represents a letters-shift instruction for the telegraph or similar typewriter. A figures-shift instruction for the telegraph typewriter is represented by a hole or notation made in all but the No. 3 code position on the tape. Most combinations of code positions or holes will represent a particular upper-case letter of the telegraph typewriter if a letters-shift signifying code rather than a figures-shift signifying code was last preceding. The same combinations of code positions will stand either for different single digit figures or marks, if preceded last by the figures-shift signifying code instead of the letters-shift signifying code. The letters and the figures-shift codes have each always the same meaning because they are provided to impart respectively to the character representing codes following them a letters-shift conditioning or a figures-shift conditioning meaning.

In distinction to the telegraph typewriters, the typewriters 20 and 22 used in the system of Figure 1 are capable of typing upper as well as lower-case characters, generally the same as any standard four-bank typewriter. These typewriters 20 and 22 include each a set of lower-case letter types 190 which are additional to the characters conventionally used in telegraph typing equipment. In the aforedescribed case-shift mechanism for the typewriters 20, 22, the same selective operations of the type keys 30 will cause typing by either lower-case types 190 or by upper-case types 191. The lower and upper-case types include respectively the lower-case types and the upper-case types of the alphabet. The Baudot code is slightly expanded or modified so that a 2–3–4 code combination if preceded by a figures-shift code 1–2–4–5 will represent a lower-case position for the typewriters 20, 22. The Baudot code is further modified so that a 1–2–4 code combination, if preceded by the same figures-shift code, represents an upper-case position for the said typewriters. As will become evident later herein, the said letters and figures-shift codes are taken into consideration by the decoder 25 in the control of the master 20 and/or the slave 22 by the tape reader 24, but do not control any case-shift or like action. On the other hand, if the tape is used to transmit data telegraphically to a receiver telegraph typewriter, said letters and figures-shift codes exercise appropriate shift control over such machines but the codes 2–3–4 and 1–2–4 in their figures-shift meaning, respectively signifying lower-case and upper-case positions for the typewriters 20, 22, are idly passed because they have no significance in reference to the telegraph typewriter.

The telegraph transmitting apparatus is preferably modified to transmit all lower-case alphabet characters as equivalent upper-case characters and to ignore or idly pass codes representative of all non-alphabetic upper-case characters. If it is known that tape prepared under the control of the typewriter 20 is to be used in telegraphic communication the typist preferably avoids use of non-alphabetic upper-case characters.

The chart immediately following defines partially the particular code employed in connection with the equipment of the invention, but, of course, the invention is not restricted to this code:

(7) Partial coding chart

| Preparatory | | Operation Character Typed or Other Operation | Letters Shift Code Made or Effective | Figures Shift Code Made or Effective | Code Punched |
|---|---|---|---|---|---|
| Code at Change to Lower Case | Code at Change to Upper Case | | | | |
| 2 3 4<br>o o o | 1 2 4<br>o o o | | 1 2 3 4 5<br>o o o o o | 1 2 4 5<br>o o o o | 1 2 3 4 5 |
| x | x | b<br>  B | x<br>x | | o   o o<br>o   o o |
| x | x | c<br>  C<br>Lower Case | x<br>x | x | o o o<br>o o o<br>o o o |
| x | x | d<br>  D<br>Tract II | x<br>x | x | o   o<br>o   o<br>o   o |
| x | x | h<br>  H<br>Tract I | x<br>x | x |   o o<br>  o o<br>  o o |
| x | x | j<br>  J<br>Upper Case | x<br>x | x | o o   o<br>o o   o<br>o o   o |
| x | x | k<br>  K | x<br>x | | o o o o<br>o o o o |
| x | x | l<br>  L<br>Tabulate | x<br>x | x | o    o<br>o    o<br>o    o |
| x<br>x | x<br>x | m<br>  M<br>·<br>  : | x<br>x<br>x<br>x | x<br>x | o o o<br>o o o<br>o o o<br>o o o |
| x<br>x | x<br>x | r<br>  R<br>4<br>  $ | x<br>x<br>x<br>x | x<br>x | o   o<br>o   o<br>o   o<br>o   o |
| x | x | v<br>  V<br>Stop Read | x<br>x | x | o o o o<br>o o o o<br>o o o o |
| | | CR3<br>Back Space | x | x | o o<br>o |
| | | CR2<br>Space | x | x | o<br>o |
| | | CR1 | x | | o |
| | | Figures Shift | | | o o   o o |
| | | Letters Shift<br>Delete<br>Tape Feed | | | o o o o o |

(8) General electrical diagram

A brief introduction to the general combined electrical diagram of Figures 14a, 14b and 14c will now be given. This diagram embraces generally from top to bottom the following equipment: the power converter 26, the tape reader 24, the decoder 25, the master typewriter 20, the encoder 21, the tape punch 23 and the slave typewriter 22. These units are identified in said combined diagram, either by boxes or parentheses in dot-and-dash lines and appropriately numbered. The general order in which these units appear in this combined diagram is from top to bottom and agrees in most instances with the flow of the operations.

A.C. power is supplied to the A.C.–D.C. power converter 26, as well as to the A.C. motor M of the reader 24, by the plug 28 at the top of the diagram. One side of the A.C. supply may include a main power switch 40 embodied in the reader 24. If said switch 40 is turned on, a pilot light 187 in the reader will light. A full-wave rectifier is shown at 188. The negative output of such rectifier is to a minus line running downwardly all along the left side of the said combined diagram. The positive output on the other hand extends rightwardly via leads 192, 193 to a plus line running down all along the right side of the same diagram. As a general rule electron flow is from the left to the right. Generally all switches in the diagram are operable downwardly by their controlling relays.

(9) Encoder 21

Referring now more particularly to Figures 2, 3, 4, 8 to 12 inclusive, and 14b and 14c, the encoder 21 and the manner of control thereof by the master 20, will now be described.

Each of the type action actuators 47 of the master 20 has pendantly connected thereto a lever 195 which intermediate its ends has a slot whereby it can fulcrum on a stud 196. The latter are provided on the various type key levers 45 but may instead be on a frame-supported member. Aside from the levers 195 which have connection with the stated type action actuators 47, there are additional such levers connected to other actuators 47 that are associated with the tabulating and the word spacing mechanisms. For every one of the levers 195 there is provided in the encoder unit 21, a vertically guided coding slide 197, such slides being arranged closely alongside of each other in a generally straight array. Each coding slide 197 has a window 198 with internal code-selecting teeth 200 and internal code-cancelling teeth 201 variously provided for cooperation with five rockable coding blades 1 to 5. The latter are identical, and extend transversely of all the slides 197 through their windows 198. Below the five blades 1 to 5 there is a blade 203 which is reversely rockable to a figures-shift or to a letters-shift position. The blades 1 to 5 are carried fast on individual rock shafts 202, and the blade 203 on a rock shaft 202a, all of which shafts near opposite ends of their related blades are pivotally carried in opposite end walls 204 of the encoder unit 21. The various slides 197 have each either a tooth L or a tooth F, such teeth being at opposite sides of the blade 203 for rocking it oppositely either to a figures-shift or letters-shift denoting position. In Figure 2 the blade 203 is shown in the figures-shift position and in Figure 8 it is shown rocked to its letters-shift position. Four comb plates 205, 206, 207, 208 give vertical sliding support to the coding slides 197 and comprise with the walls 204 a rigid framework for the encoder 21. Such framework includes also a top plate 210 and a bottom plate 211. Spring fingers 212, formed on a plate 209, cooperate variously with indentations in each slide 197 to detain them impositively in the two vertical positions to which they may be moved.

Each of the levers 195 is communicative with a related slide 197 through a Bowden wire connection 213 and a bell crank 214. The various bell cranks 214 are pivotally carried on a rod 215 which extends between the two walls 204 and are guided in a comb plate 216, the latter being secured to the comb plate 208. The bell cranks 214 act on the slides 197 through pins 217 provided on the latter. Referring especially to Figures 3 and 4 the Bowden wire connections 213 consist of tubular elements 218 having each a push wire 220 therein. The front and rear ends of the tubular elements 218 lie in parallel locating slots 223 provide in thick plates 221 and a thinner plate 222 is secured to the undersides thereof, by screws 224, thereby to secure said elements. Set screws 226 may assist in endwise holding the tubular elements 218. Closed-ended sleeves 225 are provided slidingly upon the opposite ends of the tubular elements 218 and constitute enlarged terminals for the push wires 220. Plates 228 have holes in which the sleeves 225 are freely slidable, annular enlargements 227 of the latter affording abutments engageable with the plates to contain said sleeves.

The lower ends of the levers 195 are guided in slots of a comb plate 231, such plate together with one of each of the plates 221, 222 and 228, being united with a wide pan 233 by some of the screws 224. Furthermore, the plates 221, 222 and 228 which overlie each other near the bell cranks 214 are rigidly united near the latter with said pan 233 by certain of said screws 224. Therefore, the various parts noted in this paragraph, including also the Bowden wire connections 213, comprise a sub-assembly. Such sub-assembly, near the levers 195, is attached by some of the screws 224 to brackets 234 reaching down from the sidewalls 49 of the master 20 and at the rear of the master is further attached to ears 235 of brackets 236, the latter of which are secured to a cross bar 237 and reach rearwardly and downwardly therefrom.

The coding slides 197 are much closer spaced than the type actions. This is to permit the use of relatively short coding blades 1 to 5 and 203, so that they are of little mass. The Bowden wire connections 213 are converging in the space between the bars 221 to match at the rear the spacing of the bell cranks 214. Between the slides 197 which are actuatable through the type actions, there are interspersed at certain locations other slides which are actuatable under the control of solenoids, as will later be explained. It is for that reason that there are wider spaces between certain of the bell cranks 214, as well as the related rear ends of Bowden wire connections 213.

Near the right end of the encoder 21, see Figures 8 and 12, the shafts 202 and 202a have collars 241 and 242 to locate them endwise with reference to the end wall 204. Outwardly beyond the collars 242 each said shaft carries a bushing 243 of insulating material on a reduced shaft end. On each such bushing 243 there are an inner and an outer switch finger numbered 244 and 245, respectively. A conductive bushing 246 lies between each pair of switch fingers 244, 245 and there are two dielectric end washers 247 on each bushing 243, as shown in Figure 12. On each shaft 202 and 202a, the said parts 247, 244 and 246 are compacted against the collar 242 by a nut 248 which is tightly drawn up against an underlying metal washer. The switch fingers 245 on the shafts 202 serve to give forth coding outputs under the control of the blades 1 to 5, while the switch finger 245 on the shaft 202a serves to give forth either a letters or a figures signifying output.

Having now particular reference to Figure 8, a dielectric plate 250 is fastened to the right end wall 204 by several studs indicated at 249 and has a window 251 wherethrough the shafts 202 and 202a extend. The outer ends of the pairs of switch fingers 244, 245 reach at various angles from their supporting shafts to straddle the plate 250. At the outer side of the dielectric plate 250 there are conductive surfaces 1 to 5 respectively related to the shafts 202 and also conductive surfaces F and L related to the shaft 202a. All these conductive surfaces constitute possible output terminals for their related switch fingers 245. They are of a printed circuit nature. There are a number of similar dead surfaces 252 which are engageable by the same switch fingers 245.

The inner switch fingers 244 are angularly congruent with the related switch fingers 245. As will be appreciated from Figure 11, the inner switch fingers 244 belonging to the code blades 1, 2, 4 and 5 bear always against a printed circuit surface 253 which constitutes a common input line thereto. The switch finger 244 related to the coding blade 3 has its own printed circuit input surface 254. The input for the switch finger 244 related to the figures-letters-shift blade 203 consists of a printed circuit surface 255.

In Figure 8, one of the coding slides 197 is marked "X," meaning that such slide is associated with a type action in the master 20 which is capable to print the upper case letter X or the lower case letter x. Having now particular reference to the electrical diagram of Figures 14b and 14c, there is shown in the former a type key 30 marked "X." Responsive to the operation of such key, its related actuator 47, see Figure 2, operates through a train of parts consisting of one lever 195, one Bowden wire 213, and one bell crank 214, on said code slide marked "X." The slide 197 operable under the control of the type key 30 of the action "X" can be identified by following from said key in Figure 14b a dotted line which represents the pertinent Bowden wire 213, such dotted line continuing in Figure 14c to said slide. Other Bowden wires 213 connecting related type keys 30 and slides 197 are similarly indicated by dotted lines. In Figure 8, the slide 197 marked "X" is shown upwardly actuated through the operation of the related Bowden wire 213. The coding teeth 200 on said slide have established the coding blades 1, 3, 4 and 5, in clockwise actuated positions. The code-cancelling tooth 201 on the same slide on the other hand has established coding blade 2 in counterclockwise actuated, non-coding position. The stated positioning of the blades 1 to 5 has placed the switch fingers 245 related to the blades 1,3, 4 and 5 respectively on the conductive surfaces 1, 3, 4, 5 and the switch finger 245 related to the coding blade 2 on the dead contact surface 252.

The various coding slides 197 related to other type keys have in appropriately differentiating positions coding teeth 200 as indicated in Figure 14c and as noted in the coding chart hereinabove. Code-cancelling teeth 201 are provided on each slide 197 in reference to those coding blades 1 to 5 where no coding tooth is provided.

Each coding slide 197, upon being actuated by a type action actuator 47 through the Bowden wire 213, remains indefinitely so positioned pending an operation of another slide 197. It follows thus that after each operation of a slide 197, all the coding blades 1 to 5 remain as positioned, pending an operation of another coding slide.

A newly operated coding slide 197 may actuate one or more of the blades 1 to 5, or it may restore one or more of these blades, or it may do both. The coding blades 1 to 5 are thus always positively controlled. No restoring springs are associated with said slides nor with the associated bell cranks 214 and Bowden wires, wherefore the type action actuators 47 operate against a minimum of resistance to effect coding and wherefore the typing impact is little affected by the coding mechanism.

It has hereinbefore been indicated that conventional telegraph typewriters embody alphabet types of only the capital kind, and that such types are selectable only in a letters-shift case position of the machine. Other characters, namely numerals and special-sign characters are selectable for typing in a figures-shift case position.

In conformance with this, the coding slides 197 which are in train with the various alphabet type actions of the master 20, have a letters-shift tooth L adapted to rock or to hold the blade 203 in the letters-representative position. Furthermore, all the coding slides 197 which are in train with non-alphabet type actions have a figures-shift tooth F to rock or hold the same blade 203 oppositely in the figures-representative position.

It will thus be appreciated from Figures 14b and 14c, that so long as type action controlled slides 197 are operated which have a letters-shift tooth L, the switch finger 245 on the shaft 202a will make contact with the output surface L, but as soon as a slide 197 with a figures-shift tooth F thereon is operated, the same switch finger will make contact with the surface F. Conversely, the latter condition will prevail until a slide 197 with a tooth L is operated. It is deductible from the preceding coding chart that all the alphabet type actions produce a letters-shift position and that all other type actions produce a figures-shift position.

A back space key, see Figure 14b, marked BS, as well as a space key, act through related individual Bowden wires 213 to operate coding slides 197 individual thereto, such slides having appropriate coding teeth in conformance with the foregoing chart.

*(10) Coding slide control by carriage return keys of master*

The carriage return key CR1 of the master 20, as shown in Figure 7, is operative upon a bell crank 260 which is communicative with its own related coding slide 197 via a Bowden wire 213. This carriage return key is also indicated in Figure 14b, the related Bowden wire 213 being indicated by a dotted line leading from the key CR1 downwardly, and being adapted to operate its related coding slide 197 shown in Figure 14c. The carriage return keys CR2 and CR3, see Figures 7 and 14b, control switches 262 and 263, to energize respectively through leads 262' and 263' two solenoids marked CR2' and CR3' provided on the encoder 21. The stated two solenoids are supported on the encoder by the comb plates 205, 206 and supplementary shelves 265. Upreaching armatures of these as well as some other solenoids have individual connections with related coding slides 197 in the form of rockers 266 engaging pins on such slides. These related coding slides 197 are those which have been stated to be interspersed with the Bowden-wire-actuatable slides 197. The rockers 266 are pivotally borne on a shaft 267 which extends between and has pivotal support in the end walls 204 of the encoder. Therefore, the carriage return keys CR2 and CR3, through energizations of their individually related solenoids CR2' and CR3' on the encoder, are adapted to operate related coding slides 197. One of the many Bowden wires 213, as indicated in Figures 14b and 14c, is operable under the control of the tabulating key of the master 20 to operate its own related coding slide 197.

*(11) Tape punch—introduction*

The successive settings of the five coding switch fingers 245 and the switch finger 245 associated with the letters-figures-contacts F and L, through devices henceforth to be described, determine efficient and appropriate control of the tape punch 23. In response to any operation of a coding slide 197 which additionally to setting up a new coding combination of the blades 1 to 5 also rocks the letters-figures blade 203 from either one to the other of its possible positions, there will be set up electrical sequence conditions whereby first there will be punched a letters or figures-shift signifying hole combination, as the requirement may be, and this will be automatically and immediately followed by a character code punching operation. Any operation of a coding slide 197 which does not effect a new setting of the letters-figures blade 203 will immediately and automatically produce only a character-code punching operation. The novel devices whereby the above is accomplished are of an electromechanical, efficient nature and will now be described after a brief introduction to the general nature of the tape punch 23.

Some major elements of said tape punch 23 are diagramatically represented in Figure 14c. Namely, the tape punch 23 has a start magnet designated PS, which when operated trips a single-cycle clutch, indicated at 270, causing a cycling mechanism of the punch to execute a single operation. There are five punch connecting magnets numbered P1 to P5, each of which, if operated, will connect a related punch element, not shown, for operation by the cycling mechanism. Any punch element, if so connected, will in an operation of the cycling mechanism, punch a hole in a discrete transverse position of the loaded tape 29. Said cycling mechanism, by a cam 271 controls a timing switch 272, so that energization of said punch connecting magnets P1–P5 is possible only in a home and start phase of each cycle. Another cycle controlled cam 273 closes in an early phase of each cycle transitorily a switch 274 for energizing a relay N which in turn controls switches N1 to N5 for various purposes hereinafter becoming clear.

*(12) Tape punch conditioning for operation*

In Figure 14c, near the left top corner of the sheet, there is indicated a manual switch marked "PUNCH." This is the switch which is provided at the left side of the keyboard of the master 20. If the stated switch is placed in its "OFF" position, lines 275 and 276, which it will be noted are pertinent to the various coding switch fingers 245, stand electrically incapacitated. Furthermore, also a relay G shown in the lower right-hand corner of Figure 14c stands deenergized, so that related switches G1, G2 and G3 stand unactuated, the first closed and the other open.

One feature of the invention provides that in response to turning the "PUNCH" switch on, there will automatically ensue a single cyclic operation of the tape punch 23 in which either a letters-shift code 1–2–3–4–5 or a figures-shift code 1–2–4–5 will be automatically punched, depending on whether the switch finger 245 belonging to the letters-figures blade 203 happens to stand on the switch surface L or F.

Assuming now that the operator turns the "PUNCH" switch on, and assuming further that the switch finger 245 of the blade 203 stands on the L surface, and being aware of the fact that the stated switch G1 stands unactuated, that is closed, at the time, it will be seen that such manual action by the operator establishes, a circuit leading from the minus line at the left over the closed "PUNCH" switch, the lines 275 and 276, the switch finger 245 which stands on the contact L, a lead 277, the unoperated, that is closed, switch G1, a line 278 and lines 1', 2', 4' and 5' and from line 278 also over a lead 288 to line 3', so that variously the punch connecting magnets P1 to P5 are operated. Over line 281 also the punch start magnet PS is operated. Thus all said magnets are operated, it being understood that in the home position of the cycling mechanism the switch 272 between said magnets and the positive line stands closed.

The PS magnet in being operated trips the cycle clutch 270. Because all the punch connecting magnets P1–P5 have also been operated, the ensuing cycle will produce perforations in all five code positions, namely, a letters-shift code. In the course of the cycle the cam 273 operates transitorily the switch 274 so that a circuit for the relay N is transitorily closed which extends therethrough from the minus line via a lead 282, the switch 274 and a lead 283. In turn the relay N closes a switch N5 shown near the left-hand bottom corner of Figure 14c. Resultingly, a relay G becomes operated, and by operating its associated switch G3, establishes a holding circuit for itself which persists as long as the "PUNCH" switch remains turned on. Furthermore, the actuation of the relay G opens the switch G1 which has been instrumental to pass a signal to the various punch connecting magnets P1–P5 and the punch start magnet PS. Because such switch G1 is operated, that is opened during the stated punching cycle, there will be no further cycles. For purposes later becoming evident a switch G2 is also operated by the relay G to a closed position. The circuit conditions which now prevail are as illustrated in Figure 14c.

Assuming now the situation that when the "PUNCH" switch is moved to the "ON" position, the switch finger 245 related to the letters-figures contacts L and F happens to lie on the latter contact, then an impulse will surge via the contact F, over a lead 284, an unoperated switch A2, and lead 285, branching from there out into lines 286 and 281, respectively to operate via the latter the punch start magnets PS and via lines 1', 2", 4" and 5' the punch connecting magnets P1, P2, P4, P5. Concomitantly, the lead 284 supplies electron flow through the slow-acting relay A, which responsively opens the switch A2 to cut off the flow from the just stated relays after they had time to carry out their assigned functions. The switch G2 is open while this takes place. The punch start magnet PS, by tripping the cycle clutch 270, causes the punch cycling mechanism to function so that the punch 23 will produce a figures-shift designating combination of holes. During such cycle the switch 274 is transitorily closed automatically to cause an actuation of the relay N. The transistory action of the relay N closes the switch N5 and results in the actuation of the relay G which by its related switch G3 establishes a holding circuit for itself. The switches G3 and G2 remain closed until such time as the "PUNCH" switch is turned off. Additionally to closing the switch G3, the relay G opens the switch G1 and closes the switch G2, establishing certain circuit conditions for purposes which will become later evident.

(13) *Punching a letters-shift character if letters-shift condition has existed*

In the diagram of Figure 14c, the switch finger 245 related to the faces L and F stands on the L face. Moreover, the relay G and its related switches G1, G2 and G3 stand operated because the tape punch 23 has been turned on some time previously.

If now the operator depresses an alphabet type key 30, for example one for printing the character a or A, the related coding slide 197 becomes power actuated. Such slide has a tooth L adapted to set the letters-figures blade 203 to its letters position. However, since the blade 203 is already so set, the tooth L simply assures that the blade remains so set. Thus the contact L is contacted by its switch finger 245. But there can be no flow through lead 277 for causing a letters-shift punching operation because the switch G1 stands open as previously described.

The slide being operated has also coding teeth 200 and code-cancelling teeth 201 appropriately provided so that the switch fingers 245 associated with the switch faces 1 and 2 will make contact with the latter. During any operation of a type action the transverse universal bar 56 becomes operated by sub-lever tongue 57, Figure 2. Said universal bar 56 in turn closes a switch 287, see Figure 14b, when the type action moves through a last-part of its stroke. This closes a circuit for a code timing control relay T, see lower right of Figure 14c, via an unoperated switch SO1, the operated switch 287, a lead 290 and the unoperated switch N4. The relay T closes its own holding switch T4, as well as a switch T3. The latter lies in a branch from the lead 291 and implements then, via a normally closed switch N2, electron flow over those of the switch fingers 245 which lie on their related contact surfaces 1 to 5. Concomitantly also electron flow is provided to the punch start magnet PS via a line 292. A simple code punching cycle will thus ensue in which such punching elements function as have been connected by magnets P1–P5 for operation. In the stated example holes are punched in positions 1 and 2. Incidentally thereto, as in connection with any punching operation, the record tape 29 is advanced to a new position. During the punching cycle, the cam 273 transitorily closes its related switch 274 so that a circuit is closed for the relay N. This actuates the switch N2 to drop out the coding magnets P1–P5 and the start magnet PS, the punch coming to rest after the completion of a single punching cycle. Operation of the switch N2 establishes a holding circuit for the relay N. The switch N2 will thus stay operated until the universal bar operated switch 287 opens and drops the code timing relay T and thereby opens switch T3. It follows thus that only incidental to a new operation of a slide 197 will electron flow again be able to ensue to the punch coding magnets, wherefore no repeat punchings can occur if a type action should be sluggish in its return.

(14) *Punching a figures-shift character if letters-shift condition has existed*

Certain type actions operate coding slides 197 which have a tooth F to rock the letters-figures-shift blade 203 to its figures position. If it is now assumed that at the time any such slide 197 is operated, the letters-figures-shift blade 203 is in letters position, as in Figure 14c, then the switch finger 245 associated with the contacts L and F will move from the former to contact the latter. Immediately a circuit is closed over the line 276, the contact F, the lead 284, the unoperated switch A2, the operated switch G2 and through the relay SO to operate the latter. This immediately opens the switch SO1 which is in series with the universal bar controlled switch 287, see Figure 14b, so that relay T will now be unresponsive to closure of the latter switch. An operation of the relay SO always signifies a shift occurrence of the switch finger 245 from the contact L to the contact F, or vice versa. By the energization of the shift occurrence relay SO a holding circuit is created therefor by a switch SO3, this being via line 294 and unoperated switch N3. The made contact with the surface F supplies also electron flow over the lead 284 to the relay A which in view of a capacitor 293 is slow operating and also slow releasing. Such relay A stays operated as long as the contact F has its switch finger 245 bearing thereon. The relay A operates the switch A2 with a slight delay to break the flow to the relay SO only after the latter has become reliably actuated and has closed for itself a holding switch SO3. A switch A1 is also operated by the relay A. The contacts A2 and A1 are now in their operated positions required hence for the next figures-letters shift signifying operation. The operation of the relay SO opens the switch SO1 and thereby renders the switch 287 electrically incapacitated. This for the time being prevents the operation of the code timing relay T and its related switch T3, to allow first a figures shift code punching cycle to take place. During the instant in which electron flow occurs to the shift occurrence relay SO over the line 284 there occurs also flow via the unoperated switch A2 and the line 285 to the line 286, and further to the leads 1', 2', 4' and 5' and to the lead 281. Consequently the punch connecting magnets P1, P2, P4 and P5 and the punch start magnet PS are operated. The latter starts a cycle to punch the code 1–2–4–5 which is of figures shift significance. The operation of the shift occurrence relay SO operates a switch SO4 near the lower righthand corner of Figure 14c, with the effect that a power storage device 295 in the form of a capacitor becomes loaded or charged. This occurs through lead 294 and a downward continuation therefrom via the now operated switch SO4 to the storage device 295. The cam 273 closes the switch 274 after the cycle is under way, that is after the switch SO1 has had ample time to become opened by the relay SO to hold in abeyance an operation of the timing relay T. Closure of the cam controlled switch 274 causes the actuation of the relay N and this operates switches N2, N3 and N4. The switch N3 thus drops out the relay SO, so that in turn switch SO1, see Figure 14b, restores to closed position. However, since the switch N4 is now open, electron flow to the relay T via the universal bar operated switch 287 continues to be blocked. As the shift occurrence relay SO is dropped by the switch N3 after the beginning of the cycle, there results a restoration of the switch SO4 which consequently now connects the storage device via a line up to the switch N4 but nothing more happens at this moment. When thereupon the relay N is dropped at the approach of the end of the cycle the switch N4 restores to the normal position seen in Figure 14c and causes a surge of electrons from the storage device 295 over the switches SO4 and N4 to energize temporarily the code output timing relay T. At this point it is to be noted that at the end of the cycle the switch A2 is still held actuated by its relay A. This means that the lines 284, 285 which were instrumental to cause a figures-shift punching operation stand impotent. Now, however, independently of whether the typewriter transverse universal bar 56 has already restored, the operation of the relay T effects the closure of the switch T3 for now causing a character representative punching operation. Specifically, leads 291 and 292 are now effective via the switch fingers 245 to cause operations of the punch connecting magnets P1–P5 in accord with the setting of the coding blades 1 to 5 earlier effected by the operation of the type action. The concomitant operation of the punch start magnet PS institutes now a second cycle in which perforations representative of the typed character are made, generally the same as explained under the sub-title No. 13. It is to be observed that after the start of the second cycle the relay N causes the switch N2 to stand operated and no new coding input is possible for that reason until the cycle is coming to a conclusion and the switch N2 consequently restores.

(15) *Punching a figures-shift character if a figures-shift condition has existed*

In such situation the letters-figures blade 203 holds its related switch finger 245 on the F contact. Therefore, by reason of the lead 284, the relay A stands actuated. This means that the switch A2 stands operated so that the line 285 is electrically dead and unable to carry out a figures-shift coding function. Operation of any one type action having a character belonging to the figures-shift group, will thus by its associated coding slide 197, set appropriate coding blades 1 to 5, but not the letters-figures-shift blade 203. At the end of the code setting operation imparted to said coding blades, the typewriter transverse universal bar 56 will close the switch 287. Consequently the relay T will be operated and in turn its related switch T3. As explained under the sub-title No. 13, the closure of the switch T3 will now cause the operation of appropriate coding magnets P1–P5 and the start magnet PS, the result being that a punching cycle follows in which a combination of holes will be punched which is representative of the character that has been typed. Because of the operation of the switch N2 early in such cycle, the switch T3 becomes impotent pending completion of the cycle.

(16) *Punching of letters-shift character if figures-shift condition has prevailed*

Since at the outset of such operation the contact F has its switch finger 245 communicative therewith, the relay A stands actuated and in turn also its related switches A1 and A2. Any type action which belongs to the letters-shift group is communicative through the Bowden wire 213 with a coding slide which has a letters-shift tooth L. Now, at the operation of any type action belonging to the letters-shift group, the blade 203 will rock so that the contact L instead of F will now become communicative with its related switch finger 245. Instantaneously an impulse will pass over line 276, the contact L, the lead 272, the operated switches A1, A2 and G2 to energize the shift occurrence relay SO. Such relay establishes its own holding circuit over the switch SO3. Instantaneously also the switch SO1 is opened, whereby the switch 287 is incapacitated. The operation of the typewriter transverse universal bar 56 will thus not result in an operation of the code output timing relay T and consequently the switch T3 will not pass a signal over the lines 291 and 292 to cause a character code punching operation. In the movement of the switch finger 245 from the F to the L contact, flow to the relay A is terminated but since the relay A is slow releasing, the switches A1 and A2 remain actuated for a sufficiently long time to pass the stated energizing impulse to the relay SO. Concomitantly there is passed an impulse over lead 3' and also one over the lines 285 and 286 for passage to the leads 1' to 5' and over the line 281 to the start magnet PS. A punching cycle thus follows in which holes are punched in all five code positions, this being the letters-shift code that was hereinbefore described.

At the beginning of the cycle just described, the shift occurrence relay SO is operated and through operation of the switch SO4, causes the storage device 295 to become charged. The purpose of this storage device has already been explained under the sub-title No. 14. At the approach of the end of the just described shift code cycle, the relay N is dropped, which causes the switch N4 to restore, the switch SO4 having previously restored. There surge now electrons from the storage device 295 to effect the operation of the output timing relay T. A character punching cycle consequently follows, similarly as explained under the said caption. The cycle ends with circuit conditions prevailing as illustrated in Figures 14b and 14c.

(17) *Word spacing, back spacing and representative coding*

The word-spacing key of the master, marked "SPACE" in the drawings and designated 34, causes the operation of its related slide 197 through a Bowden wire 213. Said slide has additionally to its appropriate coding teeth a figures-shift tooth F. The word-spacing mechanism operates on the universal bar, the same as the type actions. Therefore, the word-space key 34 effects coding in the same way as any type action that belongs to the figures-shift group. Always a figures-shift coding operation will be interposed if at the time the space key is operated the contact L has its switch finger 245 bearing thereon.

The back space mechanism of the master includes a key marked BS. It has no operative connection with the typewriter transverse universal bar 56. Instead it controls its own switch 296, Figure 14b, which is normally open and is in parallel with the universal bar controlled switch 287. It serves in an equivalent capacity and is rendered electrically impotent by the operation of the switch SO1, along with the switch 287. This means that the relay T will not respond to the control of the back space key if a figures-code cycle is required to precede the back space combination code. Otherwise the mode of control whereby either one or two cycles occur is exactly the same as in connection with type action controlled coding and punching.

(18) Delete code punching

The slide leftmost shown in the diagrammatic view of Figure 14c is the delete code slide. It has teeth 200 to rock all five coding blades so that upon operation of such slide all five contacts 1 to 5 are touched by the related switch fingers 245. However, the related punch connecting magnets P1–P5 and the start magnet PS are energized only upon additional closure of the switch T3, as will later become evident.

Said delete code slide 197 is operable by a solenoid 298 carried on the encoder 21, through the medium of one of the rockers 266. A delete key, so marked in Figure 1 and Figure 14c, is provided in the keyboard of the master 20, and by a switch 300 is adapted to close a circuit for said solenoid 298. However, the punch cycling mechanism must be in home position so that a switch N1, in series with the delete switch and controlled by the relay N, is in closed position. The stated circuit is from the negative line over the closed punch ON-OFF switch, unoperated switch N1, closed switch 300, the solenoid 298, a lead 301 and an unoperated switch SR4 to the positive line. In order to forestall the possibility of an operation of the shift occurrence relay SO and thus a letters-shift coding cycle, the stated delete slide carries a switch shoe 302 which as the slide becomes operated will bridge two contacts 303. This establishes a shunt circuit via the closed punch ON-OFF switch, line 275 and a line 304 to disable the shift occurrence relay SO. Therefore, the switch SO1 remains closed.

The punch start magnet PS is operated delayedly after the operation of the delete code slide. This occurs under the control of the switch T3 which is governed by the operation of the relay T. The latter is operated under the control of the delete slide 197 in a delayed manner. Specifically a spring restored bail 305 is pivotally carried on the shaft 267 of the encoder 21, see Figures 8, 9 and 14c, and is operable by the rocker 266 associated with the delete coding slide. This is to close a switch 306, see Figure 9, for a solenoid 307 which is adapted to bring into play a dummy type action represented at 308 in Figure 14b. Such dummy type action has no type head but will operate the transverse universal bar 56 with a time delay. It will now be seen that upon movement of the delete slide the switch 287 will be delayedly closed to operate the relay T delayedly and thus to effect the closure of the switch T3 after the coding blades 1 to 5 have all been fully set.

(19) Stop code punching

The keyboard of the master 20, see Figure 1, includes a stop code key. In Figure 14c this key is indicated in the upper left-hand corner. Depression of it will cause operation of a solenoid 310 carried in the back section of the encoder. This solenoid 310 will actuate its own code slide 197 by an associated rocker 266. The stop code slide has a figures-shift tooth F and is operative on the before-stated bail 305 in the same manner as the delete slide. If prior to the operation of the stop slide the L contact has its switch finger 245 lying thereon, then the operation of the letter-figures-shift blade by said slide will result in a shift of the stated switch finger 245 to the F contact, and thereby will first cause a figures-shift punching cycle, to be followed by a stop code punching cycle. Proper interposition of a figures-shift punching cycle, whenever necessary, is assured by a delayed closure of the switch T3. Namely, the stop code slide operates the bail 305 which in turn by the operation of the dummy type action 308 provides for the delayed operation of the switch 287, and therefore a delayed and ineffective operation of the switch T3 by the relay T.

(20) Slave writer operation

The slave writer, as can be clearly seen in Figure 14c, has individual solenoids 65S associated with its various type keys, its space key and its back space key. Furthermore, there are associated with the three carriage return keys and the tabulator key T of the slave, individual solenoids accordingly designated. The individual encoder slides 197 associated with the various keys of the master just mentioned have each a switch shoe 311. Having now reference to Figures 2 and 8, each such switch shoe comprises a spring leaf element borne on a dielectric block 312 and having two flexing contact ends projecting from such block. On a dielectric plate 313 which is carried on a front crossbar 314 of the encoder 21 there extends along the array of switch shoes 311 a conductive layer 315 common thereto, see also Figure 10. In the lower positions of the coding slides 197 the contact ends of their switch shoes 311 bear both on said conductive layer 315. Above said conductive layer 315 there extend transversely to its length a series of parallel, narrow contacts 316, see Figure 10. These parallel contacts 316 and said conductive layer 315 are diagrammatically represented in Figure 14c. The said narrow contacts 316 have connections 317 to the specifically related solenoids 65S, the several carriage return solenoids and the tabulator solenoid. The minus line at the left of the diagram 14c is electrically communicative with the said common conductive layer 315 through the slave ON-OFF switch and a switch T2, the latter being normally open and being closed by each operation of the relay T. Whenever it is desired to have the slave writer 22 duplicate the operations of the master, the said slave ON-OFF switch is turned on. Said switch T2 will close concertedly with the switch T3, once for every operation of a slide 197. Therefore, if said slave ON-OFF switch is in the "ON" position, closure of said switch T2 will render the conductive layer 315 electrically live every time the switch T3 sends a coding impulse over the line 291.

It will now be seen that any coding slide 197 which carries a switch shoe 311 and becomes operated, closes a circuit for a specifically related solenoid 65S in the slave 22, for such relay to operate a key in the slave 22 which corresponds to the operated key in the master. Referring still to Figure 14c it will be seen that beyond said solenoids the path of electron flow to the positive line at the right is over a network 320 and over a lead 321.

A few of the slides 197, such as the two leftmost ones in Figure 14c, have no related solenoids in the slave because no equivalent operations are required in the slave.

Two type keys in the master are designated TRACT I and TRACT II. The purpose of these keys will be later brought out. These keys are not duplicated in the slave but operate related coding slides 197 to cause the punching of codes individually representative thereof.

(21) Synchronized case-shift of master and slave

It has already been stated that the case-shift mechanism of both typewriters is exactly the same and of conventional structure.

Speaking now only of the master 20, it will be observed that an operation of either of its case-shift keys 31, 32 will produce a downward movement of the type segment 70 to upper-case position and that so long as such key is held operated the upper-case position of the segment will prevail. Depression of the shift-lock key 33 will also produce the same downward movement of the type segment 70 and thereupon such segment can only be brought up to lower-case position again by the operation and release of either one of the case-shift keys 31, 32. Thus an operation of the case-shift lock key 33 produces always a case-shift of the segment to its upper-case position but an operation of either of the case-shift keys 31, 32 may produce either a case-shift to upper-case or a case-shift to lower-case, depending on whether a case-shift operation was precedingly produced by the case-shift lock key 33. In order to retain the conventional, differentiating mode of operation of the case-shift control keys 31, 32 and 33 and yet to provide for accurate reliable case-shift control of the master and slave, as well as for reliable case-shift representative code punching, novel provision is made whereby movement of the case-shift segment 70 of the master causes the case-shift segment 70 of the slave to mimic such movements.

In Figure 14b the case-shift segment 70 of the master is diagrammatically represented in raised, lower-case position. In Figure 14c the case-shift segment of the slave 22 is similarly represented in the same position. The master 20 and the slave 22 have each a switch 322 associated with the rocker 77 of the case-shift mechanism for operation thereby oppositely respectively by the pin 326 or a pin 326a, in the second half of each opposite case-shift movement. In Figures 14b and 14c these switches 322 are diagrammatically represented as being operable oppositely by pins 326 and 326a on the case-shift segments 70 of the respective writers 20 and 22 instead of by such pins provided on the case-shift rockers 77. Said switches 322 have each an over-throw spring provision 323 whereby they will snap to opposite positions after being moved part ways toward such positions by the related rockers 77 or connected segments 70. The movable switch finger of the switch 322 of the master will thus be contacting a terminal 324 in the lower-case position of the segment 70 and also during half of the movement of the latter toward its upper-case position. Conversely, the same movable switch finger will make contact with a terminal 325 in the upper-case position of the segment 70 and during half of the movement of the latter toward its lower-case position. The slave 22 has also a switch 322 and its segment controls such switch in the same manner. The terminals of such switch, see Figure 14c, are similarly numbered. The terminals 324, 325 on the master are connected by individual leads to a solenoid UC' and LC', respectively, the latter of which are adapted to actuate individually related coding slides 197. Said solenoids UC' and LC' are provided on the shelves of the encoder 21 and operate related slides 197 through rockers 266. They are interspersed and staggered in respect to other solenoids carried on said encoder. If the "SLAVE" switch has been turned on, the operations of the stated slides 197, through their switch shoes 311 are adapted to establish individually closed circuits respectively for a solenoid marked UC and a solenoid marked LC, both on the slave and respectively associated with its case-shift lock key 33 and its shift key 31. In the movement of the segment 70 of the master from either case position to the other, as it passes the halfway position, see Figure 6, a pin 326 on the rocker 77 of the master 20 will momentarily close each time a switch 67. This switch 67 is diagrammatically represented in Figure 14b as being actuatable by the segment 70 through a pin 326, although such pin is physically on the rocker 77, see Figure 6.

It will now be explained in reference to Figures 14b and 14c how the segment 70 of the slave is caused to mimic the case-shift movement of the segment 70 of the master. In Figure 14b the segment 70 of the master stands in raised, lower-case position and the switch finger of the switch 322 lies therefore on the terminal 324. If now the segment 70 of the master is power-shifted downwardly under key control or automatically under the control of the reader 24, then the switch 67 on the master will be closed momentarily as the segment 70 passes midposition. Consequently there will be issued from the negative power line, an impulse in Figure 14b over a lead 327, the switch 67, the contact 324, a lead 328 and continued in Figure 14c over the solenoid UC' and the lead 301 to the positive line. Thus the solenoid UC' is actuated momentarily and operates its associated coding slide 197, the latter of which remains operated. The switch shoe 311 on the now operated slide 197 is ready to transmit an impulse for actuating the solenoid UC which is associated with the case-shift lock key 33 on the slave. However, such impulse is held in abeyance until such time as the switch T2 closes. It will be noted from Figure 14c that the operated coding slide has a tooth F. Therefore, if prior to the stated case-shift the contact L happens to stand contacted by its related switch finger 245, then a figures-shift punching cycle will automatically be interposed to precede the required upper-case signifying code punching cycle. In any event, either immediately or at the end of said figures-shift punching cycle there will occur an operation of the relay T. The time of the operation of the relay T is controlled in the same manner as has been explained previously. If no figures-shift punching cycle is called for, then the impulse is relatively early, it being caused by the operated slide 197 operating in succession the bail 305, the dummy type action 308, the transverse universal bar 56, the switch 287 and the relay T. Whether it be early or late, when the relay T is operated, it will close the switch T2, wherefore then the upper-case solenoid UC on the slave 22 will be energized to operate the case-shift lock key 33 on the slave, so that a power-shift of the segment 70 in the slave to upper-case will automatically ensue. The energization of the solenoid UC of the slave occurs in view of closure of a circuit via the closed "SLAVE" switch, operated switch T2, the layer 315, a shoe 311, a lead 331, the terminal 324, the switch 322 and a lead 321. Toward the end of the effected case-shift in the slave 22, the switch 322 in the slave will be actuated so that then its switch finger stands snapped onto contact 325. Previously, of course, the switch of the master snapped to the same position, so that now the upper terminals 325 on both the master and the slave are contacted.

Now the switch 322 of the master 20 is ready to respond to a case-shift movement of its segment 70 upwardly to lower-case position, that is to send an impulse via the terminal 325 of the switch 67 in the master. Therefore whenever the segment of the master in its next case-shift upwardly passes its halfway position, the lower-case solenoid LC', will be energized through a lead 332, Figure 14b, and will operate its related encoder slide 197. In turn, either in association with a lower-case signifying code operation, or at the end of an intervening figures-shift signifying code operation, automatic closure of the relay T2 will cause an automatic operation of the solenoid LC which is associated with the case-shift key 31 of the slave. The operation of this solenoid LC is through closure of a circuit which extends over the slave switch, switch T2, the switch shoe 311 of the lower-case coding slide, a lead 329, the stated LC solenoid, via the terminal 325 over the switch 322, a lead 330 and lead 321. This of course will release the case-shift lock pawl 90, Figure 6, of the slave 22, so that the segment 70 thereof will case-shift to its lower-case position.

The case-shift bodies, that is the segments 70 of the master and the slave may come into positional disagreement if the driving motor for the slave has been turned off or if the slave ON-OFF switch has been turned off or if the case-shift lock key 33 on the slave has been operated unintentionally. However such condition is readily obliterated by a simple operation and release of the case-shift keys 32 or 33 on the master. The case-shift motion which thereby is imparted to the segment 70 of the master, whether upwardly, or downwardly and upwardly, will then bring the segments in the two machines positionally into agreement. Before this is done the switches 322 on the master and the slave are of course out of agreement and neither the solenoid LC nor the solenoid UC associated respectively with the case-shift key 31 and the shift lock key 33 on the slave will come into a closed circuit condition as the case-shift segment 70 of the master in passing mid-position closes the switch 67. Therefore, no case-shift of the slave segment will occur under the stated conditions. It is advisable for the operator to operate and release the case-shift key 31 or 32 on the master once before a run of work is started. This provides that the segments 70 of both machines will then stand in lower-case position, positionally in agreement.

In certain installations in which the slave 22 is always or almost always used, the switch shoes 311 associated with the lower and upper-case coding slides 197 may be omitted and leads indicated by dotted lines 334 in Figure 14c may connect directly the input sides of the solenoids LC', UC' respectively with the leads 329, 331 that are associated with the solenoids LC and UC of the slave. Appropriate signal delaying devices, not shown, may be interposed into the leads 334 to assure that the case-shifts in the slave will be properly timed relatively to preceding and succeeding operations. With the just stated arrangement the case-shift segment 70 of the slave mimics with a slight time delay the case-shift movements of the master independently of whether the slave is actively switched on for typing response or not.

(22) *Tape reader and decoder and controlling effects therefrom*

The tape reader 24 and the decoder 25 are diagrammatically illustrated respectively in Figures 14a and the upper portion of Figure 14b. These units are substantially of known design, but because they are intimately involved in several phases of the invention, a somewhat detailed explanation thereof follows.

Figure 13:
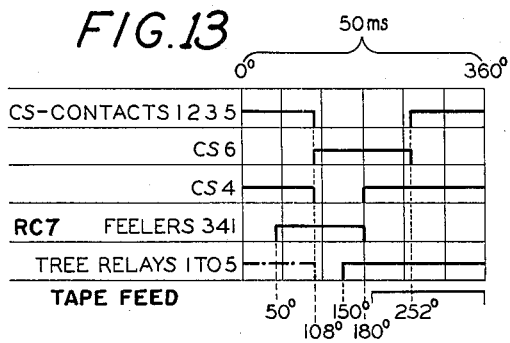
Figure 13 is a timing chart releated to the reader.

The tape reader 24 includes an indicated cyclic shaft 338 having seven cams RC1 to RC7, fast thereon. In Figure 14a said cyclic shaft is presumed to be at rest in full-cycle position. A reader cycle clutch RCC, when tripped by a cycle trip magnet CT, will cause an electric motor M to drive said shaft 338 a single turn. Said motor M is in a turned-on state in Figure 14a. The cams RC1 to RC6 control cam switches CS1 to CS6 individual thereto. The cam RC7 controls by means of a universal member 340, five perforation sensing switches numbered 1 to 5, inclusive. Said cam controlled universal member, in the home position of the cycle keeps said sensing elements 341 off the record tape indicated at 29. During each reader cycle the said sensing elements 341 under control of said cam RC7 sense off one set of perforations in a cycle range between 50° and 180°. Figure 13 illustrates such timing, inclusive also the timing of the cam switches CS1 to CS6, the duration of one cycle being about 50 milliseconds.

Assuming now that a record tape 29 has been presented to the reader and it is desired to bring the reader into action after preselecting, as desired, the master 20, the slave 22 and the tape punch 23 for operation, the operator depresses simply a START key at the right-hand front corner of the keyboard of the master 20, see Figures 1 and 14a. Such START key, by closing a switch 342, will close a circuit for the cycle trip magnet CT. Such circuit extends from the minus line at the left over leads 343, 344, unoperated switches T1, H3 and Y1, the operated start switch 342, a lead 345, the cam switch CS5, the cycle trip magnet CT and the leads 192 and 193 to the positive line at the right. Consequently the cam shaft 338 is caused to take a cyclic turn. At about 50° operation the cam RC7 displaces the universal member 340 to cause said elements 341 to sense off the presence of perforations in the tape 29, appropriate sensing switches 1 to 5 becoming therefore closed. Those of said sensing switches which are now closed are adapted to supply electron flow to related decoder relays 1 to 5 shown in the upper portion of Figure 14b. Some or all of such relays may still stand operated as a holdover condition from a prior reading cycle. Each one of the newly selected decoder relays closes automatically its own holding circuit switch 346. Said cam switch CS4 provides for delayed circuit-holding capability of said switches 346, beginning at 180° of the cycle. When the said sensing switches are first operated, the old relay selections are still held over through held switches 346, but as the cycle passes beyond 108°, the cam switch CS4 opens temporarily, the newly selected decoder relays 1 to 5 becoming effective at about 150° and becoming locked in at 180°. The decoder relays with their associated holding circuits constitute a memory device controlled by the sensing of the combination of holes in the tape 29. The sensing elements 341 become withdrawn by the cam RC7 at about 190° of the cycle. During the remainder of the instituted cycle, in a well-known manner, mechanism in the reader 24 will advance the record tape 29 one step to stand ready for the next reading action of the sensing elements which will take place at the beginning of the next cycle. Such mechanism is illustrated in Figure 14a. It comprises on the cycling shaft 338 a cam 425 for reciprocating a bell crank 426 which has a pawl 427 for feeding a ratchet wheel 428. This wheel is unitary with a sprocket wheel 429 which engages feed perforations in the record tape 29.

Referring now more particularly only to the upper, decoder portion of Figure 14b, said decoder relays 1 to 5 are leftwardly operative on various decoding switches 348 making up a decoding tree 350 which has an input line 357 and which is generally well-known in the art. Dotted lines 351 are indicative of the connections which such decoder relays have with said decoding switches 348. The said tree 350 has additionally to the decoding switches 348 a series of switches designated LF and a switch F2, all of which are operable by a relay F as indicated by a dotted line 349. The latter relay stands relaxed in Figure 14b so that the movable contacts of all said LF switches as well as the F2 switch stand rightwardly moved and make contact with tree output lines 352L, which with a few exceptions are related to such keys of the master 20 that belong to a letters-shift grouping. Whenever said relay F is operated, the said movable contacts of the LF switches are communicative with output lines 352F which with a few exceptions relate to keys of the master that belong to a figures-shift grouping.

For the present it is assumed that the relay F stands unoperated as in Figure 14b, and also that for the time being no perforations will be sensed which represent either a figures or letters signifying combination 1-2-4-5 or 1-2-3-4-5.

Speaking now again of the instituted cycle, the cam RC6 renders a relay H active at 108° and to 252°. This is via the line 343, the cam switch CS6 and a line 354. As the relay H is operated it establishes for itself, by operating a switch H1, a holding circuit. This holding circuit stays on for an indefinite time and is over line 343, unoperated switch Y2 and operated switch H1. At 252° of the cycle the cam switches CS3 and CS2 again close but because relay Y stands unoperated and thus switch Y4 stands open, this will have no effect. As the 252° position is reached the holding circuit for the relay H is still effective and there will now issue electron flow over line 343, the still unoperated switch T1, the operated switch H3, a lead 355, closed cam switch CS1, a lead 356 and branching from the latter three ways, namely into the tree input line 357, the relay Y to the lead 193 and the relay H to the positive line. The thus operated relay Y in turn closes its related switch Y4 and opens switch Y2, the latter thereby disrupting the holding circuit for the relay H to drop it out. The decoding tree 350 receiving now a signal over the line 357, causes the operation of the appropriate key-operating solenoid in the master in accordance with the decoder relays 1 to 5 which were operated earlier in the cycle. Therefore the proper typing or other operation is automatically instituted in accordance with the perforations which in the reader were sensed at the beginning of the cycle.

Beyond the selected keyboard solenoid the circuit is rightwardly over a network 358, Figure 14b, and a normally closed switch SR4 to the positive line. No matter what keyboard solenoid of the master is operated, it will bring about the required operation in the master writer 20, the slave 22 and the punch 23, providing however any such unit stands predeterminedly selected for operation by the three switches at the left of the keyboard of the master 20, Figure 1. For the most part these operations institutable by the operation of the various keys of the master 20 have been related already. It will be remembered that each key operation of the master is followed with some time delay by an operation of the relay T. The record tape 29 includes all letters-shift and figures-shift representative perforations. The relay T restores only after each automatically instituted operation of the master 20, the slave 22 and the punch 23 has progressed sufficiently far along so that a next operation of any involved unit can succeed without conflict of succession. The switch T1 in the reader, Figure 14a, in view of the delayed operation of the relay T ensuing in any instituted operation, as has already been explained in connection with manual operations of the keys of the master, will operate in a late part of the reader cycle. Under some circumstances the switch T1 may operate slightly after the conclusion of the reader cycle. So long as the switch T1 remains unoperated, the cam switch RC1 will continue to keep the relay H operated.

Whenever sequential to the operation of the relay T the switch T1 becomes operated there is effected a closure of the circuit for the cycle trip magnet CT over a line 343, line 344, operated switch T1, operated switch Y3, the unoperated stop-key operable switch 360, line 345 and the cam switch CS5. If the cycle trip magnet CT operates before the conclusion of the cycle, then the next cycle will follow without any pause. Incidental to the operation of the switch T1, the relay H becomes dropped because the switch Y2 was operated before, that is it was opened. Because of the dropping of the relay H the switch H2 restores upwardly. If at this point the switch T1 still remains operated there will be established a holding circuit for the relay Y which extends over line 343, line 344, operated switch T1, line 361, restored switch H2, still operated switch Y4. If at 108° of the cycle the switch T1 is still operated, then the just stated holding circuit will be automatically interrupted. Namely, at such point in the cycle the cam switch CS6 will cause the operation of the relay H and in turn the operation of the switch H2. Because the cam switch CS3 opens at the same time there can be no other holding circuit established for relay H and operated switch H2. If the switch T1 restores any time before the 108° point in the cycle is reached, then the cam switch CS3 will provide that at passage of the 108° point the relay Y will open.

In the new cycle which is in progress, the sensing elements 341 will sense a new set of perforations at 50°, and at 180°, under the control of the cam switch CS4, via line 347, the appropriate decoder relays 1 to 5 stand selected by their holding switches 346, Figure 14b. Meanwhile at 108° the relay Y becomes dropped under any circumstances. The switch T1 may restore in the cycle of the reader any time after its operation or after the conclusion of the cycle, depending on the length of operation of the relay T. Particularly in connection with carriage return operations and tabulations, this may be long after the conclusion of the started cycle of the reader, as will appear under the sub-title No. 24. Always at about 108°, both the cam switches CS3 and CS2 open and drop relay Y so that the switches controlled by the latter will be restored. Simultaneously cam switch CS6 energizes relay H which by operation of its related switch H1 will lock in. As before stated, whenever the switch T1 restores it will send an impulse to the decoding tree 350 and will also energize the relay Y. Said impulse may occur any time after the 252° point in the cycle has passed and may come after the conclusion of the cycle, that is while the cycling mechanism stands arrested. It follows that the impulse which goes forth to the tree 350 will result in an operation of the appropriate keyboard relay in accordance with the control condition held over from the beginning of the cycle by the memory-constituting decoding relays 1 to 5.

The operations explained are repetitive so long as new cycles are instituted by restorations of the switch T1.

In certain sensing positions the tape 29 has a complete absence of perforations. Such sensing conditions are conventionally termed "null" codes and denote the idle spacing of the tape when it was produced. In the reader 24 they are required to be passed idly. If in a cycle started by an operation of the switch T1 the reader senses such a null code then none of the decoder relays 1 to 5 will stand operated after the 108° position in the cycle is passed. When thereafter in such cycle, or at the end thereof, the switch T1 restores, the impulse sent forth to the tree 350 will be routed over a series of unoperated tree switches 348, to emerge beyond the tree over a so-called null line 362, an unoperated switch 363, the line 345, the cam switch RC5 and the cycle trip magnet CT. Thus a reader cycle is this time instituted in the normal position of the switch T1. If now in such further instituted cycle again a null code is sensed, then the cam switch RC1 which closes at 252° will cause another impulse to be issued to the tree input line 357 which will emerge from the decoder tree via the null line 362 to operate the trip magnet CT.

Combinational codes 1-2-3-4-5 and 1-2-4-5, respectively stand for a letters-shift and a figures-shift. In Figure 14b the figures-shift relay F stands relaxed and assuming that in such condition a figures-shift code is sensed in an instituted cycle, there will be set up the appropriate tree switches 348 by the decoder relays. Late in the cycle or after the conclusion thereof there will ensue a tree input which is routed to emerge via the unoperated tree switch 348F in two branches, one numbered 364 leading to the relay F2 to operate it and another line numbered 365 leading over the unoperated switch F and over a lead 366 to the null output line 362. Therefore the relay F operates all the switches LF leftwardly and by operating a switch F1 will produce for itself a holding circuit which includes the lead 327 and another lead 367. Any code other than a letters or figures-shift code sensed thereupon will cause the setting up of coding switches 348 as before but as the tree input occurs it will emerge from the tree over one of the lines 352F to select a key belonging to the figures-shift group.

Any time when later a letters-shift code is sensed off the tape, there results, incident to the tree input following it, a tree output which is routed to emerge via the tree switch 348L in two branches. One such branch is line 368 to shunt relay F, and another includes line 370 which via the operated switch F2 and the lead 366 connects to the null line 362. The relay F is thus dropped, wherefore the switches LF restore to the condition seen in Figure 14b. Moreover, in the cycle that ensues due to the emergence of a signal over the null line 362, the then sensed perforations will set up appropriate tree switch conditions, and subsequently the impulse sent to the tree near the conclusion of the cycle will give forth an output over one of the tree output lines 352L. Thus a particular key in the master writer 20 will be operated which is one belonging to the letters-shift group.

The letters-shift code 1-2-3-4-5 stands also for a delete operation. Whenever its presence results in a tree output via the switch 348L, it will cause punching of the same code in the tape punch 23. This is by a lead 371 connecting lead 370 to the solenoid 298 for the delete coding slide.

Any cycle instituted via the null line 362 occurs as a continuation of the concluding cycle, so that there is no waste of time. The sensing of a hole combination 2–3–4–5, if a figures-shift code rather than a letters-shift code was last preceding, will automatically produce near the conclusion of the instituted cycle, a tree output via lead 372 and normally closed switch SR3 which will shunt and thus drop the relay H, restoring switches H1, H2 and H3. Relay Y is also dropped because switch H2 opens. Thus at the conclusion of the cycle the circuit conditions shown in Figure 14a prevail wherein only the operation of the start key is able to cause an operation of the cycle trip magnet CT.

It has been said that auto stop signals are issued over lead 372. So that the tape punch 23 may produce an auto stop code automatically under control of the reader, there branches from the auto stop lead 372 a lead 423 to cause the operation of the auto stop solenoid 310. The latter by operating its associated coding slide 197 will cause the punch to produce an auto stop signifying code. A switch 424 may be included in the lead 423 whereby the production of a stop code may be eliminated at will.

The START and STOP keys described in connection with the reader are preferably provided in the keyboard of the master 20 as indicated in Figure 1.

(23) Correlated carriage returns in the master and/or the slave, without representative punching The selective carriage return mechanisms embodied in the master as well as in the slave were described under sub-title No. 4. Under the sub-title No. 10 it was explained how the carriage return keys in the master 20 operate coding slides 197. Furthermore, it was explained under the sub-titles Nos. 13, 14, 15, 16, how such coding slides control the tape punch to effect punchings representative of different selective returns, a letters-shift code being interposed whenever required by the circumstances, as hereinbefore brought out.

Having now particular reference to Figure 7 there are shown near the bottom thereof three solenoids CR1, CR2 and CR3 which respectively are adapted to operate the elements 119, 132 and 139 in the slave that are related to the carriage return keys therein. Whenever any one of the carriage return keys of the master is operated, the related coding slide 197 moves a switch shoe 311 to then bridge an individually related contact 316 with the aforestated comomn contact or layer 315. The common contact 315 is thus brought in circuit with one of the solenoids CR1, CR2 or CR3 on the slave via one of the leads 381, 382 or 383. Providing therefore, that the slave stands selected for operation by the "SLAVE" switch, there will ensue responsive to the operation of the switch T2, when it occurs as an incident to an operations of a particular carriage return key in the master 20, an operation of the related carriage return solenoid CR1, CR2 or CR3 in the slave 22. Therefore, providing the "SLAVE" switch stands closed, any carriage return key operation in the master 20 will become duplicated in the slave 22.

However in the event the "MASTER" switch has predeterminedly been placed in the "OFF" position, any selective operation of a carriage return key in the master is ineffectual in respect thereto. As will be understood with reference to Figure 5, in such event the carriage on the master is held arrested by the operated clamp 162 and, furthermore, the carriage return drive mechanism stands incapacitated because its control arm 115 is held in its open-clutch position by the bell crank 164.

From this it will be seen that the various carriage return keys in the master are controlling in respect to either the master, the slave, or both, depending on which of such individual writers stand selected. If neither writer stands selected but the punch 23 stands selected, then only the appropriate return signifying punching operation or operations will be produced and both writer carriages will stand stationary.

It will be understood that the corresponding carriage return stops on the carriages of the master and the slave are individually settable to define carriage return positions individually of each other. Return runs of the carriages are thus concluded independently of each other. In fact, under certain circumstances, the carriage of either writer may stand already in a position corresponding to the return called for by the return key operation. In such event such carriage will be moved only sufficiently to produce a usual carriage return shut-off action. Each writer 20, 22 may embody a usual line spacing mechanism, not shown, to which the carriage return drawband may be connected for operation thereby at the outset of each carriage return.

(23a) Carriage return operations in master and/or slave and carriage return signifying punching Both, the master 20 and the slave 22 are equipped with mechanisms whereby their letter-feed carriages 35 may be returned selectively to differing positions.

Provision is made to control the tape punch in connection with instituted carriage returns in either or both writers to produce perforations representative of the specific selective returns effected, and to cause automatically when required, the interposition of a letters-shift representative punching operation ahead of the specific return representative punching operation. Carriage returns may be instituted by selective operations of the return keys in the master or automatically under the control of the tape 29 in the reader. One feature of the invention is that whether a carriage return is instituted manually by a selective operation of a carriage return key or automatically under control of the reader, any kind of operation can succeed thereafter only after the conclusion of the instituted return in either or both writers and also only after the conclusion of a carriage return representative punching operation if the punch 23 stands turned on.

(24) Reader-instituted carriage return operations and provision to delay the next reader-instituted operation pending carriage return conclusion or conclusions It will now first be assumed that the slave 22 stands idly conditioned by the "SLAVE" switch being open, and further that the punch 23 stands unselected. If under such conditions a carriage return in the master 20 is automatically instituted under the control of the reader 24, it will by the operation of the appropriate solenoid CR1, CR2 or CR3 on the master cause the operation of the connected carriage return key CR1, CR2 or CR3. This will be evident by reference to Figures 14a, 14b and also Figure 7. The operation of any of the carriage return keys on the master will result in an operation of the carriage return instituted latch device 120, so that the spring 121 will move the lever 117 to closed clutch position. Depending on the particular carriage return key that is operated, the carriage return counterstop 123 will now have the required graded vertical position for cooperation with the appropriate carriage return terminating stop CR1, CR2 or CR3. Therefore the carriage return of the master will be terminated as the appropriate one of such stops strikes the counterstop 123 and thereby restores the arm 115 to the control of the latching device 120. Incident to any operation of a carriage return key in the master, the latch operating lever 122 through an ear 389 thereon will close a switch 385 in the master. The lever 122 will restore almost immediately but meanwhile the arm 115 moving upwardly in Figure 7 will continue to hold the said switch 385. The operation of said switch 385 establishes an operating circuit for a relay Z which is shown in Figure 14c at the right near the bottom. Such circuit is over a lead 327 in Figure 14b, the stated switch 385, a lead 386, an unoperated switch D1 and the relay Z, both in Figure 14c. The relay Z is slow-operating in view of an immediately related capacitor and a switch Z3. The operation of the relay Z effects the closure of a switch Z2 shown in Figure 14b. Because the tape punch 23 has not been selected for use, the switch SO1 shown in Figure 14b only being in an unoperated condition, that is closed, so that closure of the switch Z2 establishes an operating circuit for the relay T. This closed circuit extends via the closed switch Z2, the lead 290, the unoperated switch N4 and the relay T. Furthermore, such circuit will be dropped only incidental to the completion of the carriage return in the master when the arm 115 therein restores and opens its related switch 385 and in turn causes the relay Z to drop. This has the effect of opening the switch Z2, and further the dropping of the relay T. For the entire duration in which the relay T stands operated, the switch T1 associated with the reader 24 stands operated. From this it will be perceived that upon the institution of any carriage return in the master, a next control signal from the reader 24 via the tree input line 357 to the decoder 25 can ensue only after the completion of such return.

It will now be assumed that additionally to the master 20 the slave 22 also stands selected or conditioned for operation and that one of the carriage return keys in the master becomes automatically operated under the control of the reader by a signal issued over the tree input line 357. In such case the carriage return key operation becomes duplicated in the slave 22 and, as will be seen, somewhat delayedly only as the relay T operates. This is because the latter is in control of the switch T2 which is interposed between the "SLAVE" switch and the common contact face 315 with which the coding slide shoes 311 are associated. Upon the operation of the switch T2 resultant from an operation of a carriage return key in the master, the related carriage return instituting solenoid CR1, CR2 or CR3 in the slave becomes energized by electron flow supplied over said now closed switch and the appropriate coding slide shoe 311. The operation of the carriage return key which thus ensues in the slave will cause an arm 115 in the latter to operate a switch 385 associated therewith, Figure 14c. This switch 385 of the slave, along with a switch 184 in the slave and the closed "SLAVE" switch is interposed in a series of leads 388, 390 and 391. As soon as the relay Z operates consequential to the operation of the carriage return key in the master, it closes the switch Z2 in the manner before stated to the end of operating the relay T. A further immediate result is that a holding circuit for the relay Z is established over the "SLAVE" switch, the leads 388 and 390, the unoperated switch 385 in the slave and a lead 392. It will now be perceived that if the carriage return action in the master is very short or amounts only to a line spacing operation, such action may come to a conclusion before the return operation on the slave gets instituted. However, because of the holding circuit which resulted from the operation of the relay Z1 the operation of the relay Z will be continued until a moment after the carriage return in the slave becomes instituted. Namely, until after the switch 385 in the slave becomes operated, the relay Z being somewhat slow in releasing. This assures that the relay T will not be dropped prematurely, which action would result in a premature next signal-issuance from the reader over the switch T1 to the tree input line 357. The switch 385 in the slave by becoming operated will close a circuit for a relay D seen in Figure 14c. In turn the switch D1 is operated and thereby a holding circuit is established for the relay D, such circuit extending over lead 327, Figure 14b, operated switch 385 in the master, the lead 386 and the operated switch D1. The operation of the switch 385 in the slave establishes additionally a further closed circuit for the relay T, this being parallel over the operated switch T4 and the unoperated switch N4. It will now be noted that with these circuit conditions established, the relay T will drop out only if the switches 385 in both the master and the slave become opened. In such machines the switches 385 are opened independently of each other responsive to the restoration of the arm 115 in each at the conclusion of the carriage return run. Therefore the relay T drops out only when the carriages in both machines have fully returned. Furthermore, since the relay T incidental to its operation and restoration respectively operates and restores the switch T1 which is associated with the reader 24, Figure 14a, it follows that a next signal output of the reader to the decoder tree is possible only after the carriage returns in both writers have come to their conclusions.

Now considering the situation wherein the master stands unselected for operation, then the depression of any carriage return key in the master is unable to cause a closure of the carriage return clutch in the master because the bell crank 164 stands operated by the solenoid 151 and blocks the arm 115 against clutch closing operation. However, any carriage return signal passed via the decoder 350 to the solenoid CR1, CR2 or CR3 in the master will nevertheless cause the operation of its related carriage return coding slide, the latter of which in turn by its switch shoe 311 will cause the operation of the appropriate return key in the slave, the same as before stated. It will be noted that in this instance the switch 385 in the master is closed only by the operation of the lever 122, that is by its ear extension 389 as can be seen in Figure 7. This will result in an operation of the relay T which in turn closes contact T2, the latter closure effecting the actual transmittal of the operating impulse to the selected carriage return solenoid in the slave. As the appropriate carriage return key in the slave becomes operated and while the relay T is still energized, the switch 385 in the slave closes a second circuit for the relay T which extends via the lead 388, the unoperated switch 184 on the slave, the lead 390, the operated switch 385, lead 391 and the unoperated switch N4. Concomitantly, through an extension of the lead 391 the relay D is also operated but in this instance this is only incidental and has no useful purpose. The relay T subsequently is subject to release only consequential to the conclusion of the instituted carriage return in the slave, namely as the switch 385 therein is opened through the restoration of the arm 115.

(25) *Reader instituted carriage returns in master and/or slave with a return-signifying punching operation cycle*

It is assumed now that the tape punch 23 is effectively conditioned and that an input signal is issued over the unoperated switch T1 to the tree 350 after the latter has been conditioned for a given carriage return output. Either or both of the writers 20, 22 are assumed to stand connected. A letters-shift punching operation has precedingly occurred under the control of the record tape in the reader 24, whereby the sensed code combination is interpreted in the letters-shift sense. In other words, only the actual carriage return signifying punching operation is required to occur and the shift-occurrence relay SO remains unaffected and leaves the switch SO1 in unoperated, closed condition. The signal passed over the tree 350 causes an operation of an appropriate carriage return key CR1, CR2 or CR3 in the master. The so operated key operates the switch 385 and thereby will cause an operation of the relay Z which as previously pointed out is slow-operating. Thus the switch Z2 becomes closed with some time delay. The punch 23 up to this point has remained idle inasmuch as there has been no call for an operation of the shift-occurrence relay SO because the switch finger 245 associated with the letters-figures-shift blade 203 has previously been standing on the contact L. Furthermore, the switch N4 up to this time has stood closed because no punching cycle has yet been instituted. As the switch Z2 closes, the relay T becomes energized. The latter by operating the switch T3 causes a cycle of the punch 23 to be instituted in a manner as previously described under the sub-title No. 13. In such cycle the appropriate carriage-return representative combination of holes is punched. The relay T by its operation closes its holding circuit switch T4. This has the effect that, although in the punching cycle the switch N4 opens, the relay T nevertheless will remain operated. It will remain operated so long as an instituted carriage return in the master 20 or the slave 22 remains uncompleted, and always sufficiently long enough for the stated punching cycle to get well under way. The means whereby the relay T is caused to so remain operated, involves most of the circuitry explained under the sub-title No. 24, which circuitry includes the relay Z and the relay D as well as the switches 385 in both the master and the slave. The end result is that the relay T will be dropped only when it is safe for the switch T1 to restore and thereby to pass to the tree 350 the next operation-instituting signal.

(26) *Manually instituted carriage returns in master and/or slave with accompanying letters-shift as well as carriage return-signifying punching cycle*

A letters-shift punching cycle is required to precede the carriage return punching cycle whenever a carriage return is manually instituted and at such time the switch finger associated with the letters-figures-shift blade 203 happens to stand on the contact F. Any of the coding slides 197 which are operable by the carriage return keys CR1, CR2 or CR3 on the master are adapted to operate the blade 203 so that the related switch finger 245 contacts the L contact, providing such condition has not previously been attained. Such operation takes place always slightly before the switch Z2 has a chance to become closed by the aforestated switch 385 in the master. If the switch finger 245 so moves onto the contact L, the shift-occurrence relay SO (and in turn its controlled switch SO1) is immediately operated through line 277, switches A1, A2 and G2; relay A being slow releasing as pointed out in sub-title No. 14. The movement of the stated switch finger 245 onto the contact L instantaneously institutes a cycle of the tape punch in which a letters-shift code is punched. At the very beginning of such cycle the relay N is operated and then continues to be operated until the cycle is almost completed. Thus the switch N4 is open almost throughout the letters-shift punching cycle. The switches SO1 and N4, being controlled as stated, defer electron flow over the closed switch Z2 until the letters-shift cycle comes to its conclusion. It is then that through closure of the switch SO1 the relay T becomes energized. The energizing circuit extends over the restored, closed switch SO1, the operated switch Z2, line 290 and the restored switch N4. The operated switch T2 will now institute the second punching cycle in the same manner as explained under the sub-title No. 14. The operation of the relay T is sustained until the carriage return operation or operations have concluded, substantially the same as explained under the several preceding sub-titles. Furthermore, the relay T stays always operated at least until the second punching cycle is completed.

(27) *Correlated tabulating in master and/or slave, with, or without representative punching*

Under the sub-title No. 3 a tabulating mechanism shown in Figure 5 and embodied in both the master and the slave was described. A key designated TAB in Figure 5 represents a tabulating key which is embodied in the master as well as the slave. Such key is indicated in Figure 14b for the master and in Figure 14c for the slave. Each such TAB key is adapted to be operated by its own related solenoid designated TAB. Such TAB solenoid in the master is operable automatically under perforated tape control by the reader whenever a code combination 2–5 is sensed in the latter. Of course a figures-shift code rather than a letters-shift code has been last preceding on the control tape to impart a tabulation meaning to the code combination. It is understood that if the punch does not stand selected for operation, then neither of the stated cycles will occur.

Providing the slave 22 stands selected for operation, the TAB key thereon will become operated automatically in the same delayed manner as the carriage return key is subject to delayed operation under control of the carriage return key in the master. This is via a lead 395, see Figure 14c, which will operate the TAB solenoid in the slave.

The tabulating reed nose 183 on the master responsive to the operation of its related TAB key closes its associated switch 184 which is shown in Figures 5 and 14b. This switch 184 is provided in parallel with the switch 385 controlled by the carriage return mechanism of the master. It serves the equivalent purpose as said switch 385, namely to operate initially the relay Z. The same as with said switch 385 relay Z figures later on in the control of the relays D and T.

The switch 184 which in the slave 22 is operable by the tabulator reed nose 183 has a purpose equivalent to the switch 385 in the slave which is controlled by its three related carriage return keys. Therefore, the said switches 184 in connection with the tabulations serve in the same capacity as the switches 385 do in connection with carriage returns. Particularly, also, the dropping out of the relay T occurs similarly as explained in connection with the carriage returns. Namely, in case only the master is in use then the relay T drops out automatically responsive to the conclusion of the tabulation therein as the switch 184 opens due to the restoration of the reed 96. In the event the master and the slave are in use, the relay T drops out automatically after both the switches 184 in the master as well as the slave have restored consequential to the completion of the individual tabulations therein.

If the punch stands disabled, the operation of the relay T is substantially immediately the same as in connection with a carriage return unaccompanied by a punching operation.

(28) *Device to predetermine selectively transscriptive reading of select record tracts*

In Figure 15 there is shown a record tape 29 which has usual operation controlling perforations therein and additionally has at select intervals codal perforations 3–5 or 1–4. These stated special codal perforations head and thereby denote in the control tape 29 tracts or runs of perforations of different classification or control use, one such tract being denoted TRACT I and the other TRACT II. These tracts in the tape are preselectable for controlling effect with respect to the writers 20 and 22 and/or the punch 23. To this end a tract selector switch 400 which has association with specific output leads of the decoder tree 350 marked TRACT I and TRACT II, see Figures 14b and 14a as well as Figure 15.

The track selector switch 400 includes a shaft 403 which is turnably adjustable by a control knob 404. The shaft 403 has mounted individually insulated thereon, two switch fingers 401, 402. Two groups of three switch taps 411 and 412 are respectively associated with said switch fingers 401 and 402. The stated TRACT I and TRACT II output leads from the decoder tree 350 are respectively connected electrically with the switch fingers 401 and 402. The individual switch taps of said groups 401 and 402 are symbolically shown in three different shapes to identify each with a particular function it is adapted to bring about if contacted by its related switch finger 401 or 402. Legends shown below Figure 15 denote in connection with said differently shaped taps the related functions. Obviously, in the actual machine the taps may be of identical form.

The switch 400 is shown provided on the reader 24, see Figure 1, but it may be more advantageously provided on the master writer 20. The knob 404 has a pointer which in reference to indicia seen in Figures 14a and 15 indicates the tract or tracts which stand selected.

In Figure 14a the tract selector switch 400 stands positioned so that its pointer registers on the indicium "TRACT I + TRACT II." This means that all control tape tracts stand preselected to exercise control, substantially as though the apparatus included no tract selecting feature. From said Figure 14a it will be seen that when a signal issues over either one of the leads designated TRACTS I or II, it will pass over the therewith connected switch finger 401 or 402 to the contacted diamond-shaped switch tap and via a lead 406 to the switch 363. Assuming this switch is in normal unoperated position as in Figure 14a, then the stated signal is active over the lead 345 and the cam switch CS5 to operate the cycle trip magnet CT of the reader 24 so that an automatic tape spacing cycle occurs therein. Thereupon, the reader proceeds to issue automatically controlling signals to the typewriters and the punch, in the manner set forth under the subtitle No. 22. In a sense it may be stated that when the tract selector switch 400 is set as in Figure 14a, then the reader passes each tract signifying or heading perforation idly and then proceeds to read the perforations with transcriptive effect.

When the reader is functioning with the stated setting of the switch 400 it may be caused to cease operation as either of said tract identifying or heading perforations are sensed. To this end the "STOP" key shown in Figure 14a is operated and held until the next tract identifying perforation is read. Because the operated "STOP" key opens the switch 363, the reader will then be unable to transmit a signal via either the tract I or tract II leads and over the lead 406 to operate the cycle trip magnet CT. Reader action may again be started anytime by operating the before described "START" key shown in Figure 13.

In the schematic showing of Figure 15, the tract selector switch 400 has been set to preselect for control action such tracts of the tape which are headed by a tract I identifying combination of perforations. In such adjusted state of the switch 400 each tract headed by a tract II identifying perforation, in response to the sensing of the latter, will be automatically skip-read without any controlling effect on the writers and the punch, continuous reader cycling providing for fast skip-reading and spacing of the control tape 29.

Whenever a tract code I is read by the reader, the tree 350 will first be conditioned accordingly and then there will issue a signal over the tree 350 which will emerge over the tract I lead to the switch finger 401 of the tract selector switch 400. Said switch finger 401 stands on the rectangularly shaped contact of group 411 and the issued signal passes over a lead 413, the unoperated switch SR2 and a lead 414 to operate the cycle trip magnet CT and thereby to institute a reader spacing cycle which will bring the tape 29 to a next reading position. In such and following reading positions, until a tract II code is read, the codes will result in a transcriptive writing and/or punching, as will become evident in the next few lines.

In connection with any tract that is to be skip-read, a relay SR is always automatically energized in response to the sensing of the tract code which is heading it. Furthermore, such relay by operating a holding circuit switch SR1 will stay operated. Because in the stated setting of the tract selector switch to the indicium tract I, the tract I when reached must become actively controlling, it follows that in response to any tract I code being sensed the relay SR must be deenergized. This is accomplished through a branch lead 415 from the lead 413, whereby the relay SR will be shunted so as to release and drop out its holding circuit. From this it will be seen that the circuit for the cycle trip magnet is completed only as the switch SR2 restores due to the shunting of the relay SR. After the stated automatic cycle which follows the sensing of the tract I code, the reader functions in the normal manner as explained under the subtitle No. 22. Namely, as the perforations in tract I are being read they cause typing and punching operations. Eventually a tract II code will be read. Because the tract selector switch 400 stands set for active reading of tract I, the code perforations headed by the tract II code are to be idly skip-read without effect on the typewriters and the punch. A signal is emitted to the tract II lead responsive to the restoration of the switch T1 following the previous signal issuance. The signal to the tract II lead is issued by the reader 24 in the regular way via the tree 350, and beyond the tract II lead it extends over the switch finger 402, the circular tap of the group 412 and a lead 416 to energize the relay SR, the circuit being concluded over a lead 415 and the lead 192. The relay SR closes its stated holding circuit switch SR1. By being operated said relay SR also opens a switch SR4 which in Figure 14b is near the positive line, thereby incapacitating the solenoids in the keyboard of the master 20, as well as the special function solenoids which operate coding slides. Therefore the typewriters 20, 22 as well as the punch 23 stand now disabled.

In view of the operation of the relay SR its related switch SR2 becomes operated and stays so operated. Thereby a circuit is established which extends from the negative line over leads 343 and 344, and over the unoperated switch T1, the operated switch H3, the lead 355, the closed cam switch CS1, the lead 356, the operated switch SR2, the line 414 and the cycle trip magnet CT, the latter of which thus becomes operated and trips the reader cycle clutch RCC causing an institution of a reader cycle.

From the time at which the tract II code is sensed, that is responsive to the restoration of the switch T1 which results from the conclusion of a previously instituted operation, the said switch T1 remains closed until a tree output over tract I lead follows. As has been stated under sub-title No. 22, so long as the switch T1 remains unoperated following its return, the relay H in the reader remains operated. This is because during said period of time the cycle controlled cam switches CS1 and CS6 take turns to keep the relay H continuously operated. Therefore the switch H3 stands operated for such duration. This is why following the stated issuance of the signal over the tract II lead there ensues electron flow over lead 343, unoperated switch T1, operated switch H3, lead 355, cam switch CS1, lead 356, operated switch SR2 and lead 414 to the cycle trip relay CT to operate it. The latter institutes a reader cycle in which the tract II code on the tape is fed beyond the sensing position. During the so instituted cycle the cam RC1 opens and closes its cam switch CS1, whereby the circuit of the cycle trip magnet CT is momentarily interrupted, causing a new cycle. Thereafter, as long as the switch SR2 remains operated, there will ensue new reader cycles in the same manner by intermittent operations of the cycle trip magnet CT. During such further cycles the holes in the tract II are sensed without controlling effect on the typewriters 20, 22 and the punch 23, because the switch SR4 which is associated with the solenoids of the master, as well as the other coding slide operating solenoids, is open. However, when finally a tract I heading perforation is sensed, it will set up the appropriate condition in the tree 350 and additionally there will pass an effective signal via the so conditioned tree and the tract I lead which will shunt the relay SR, causing it to drop out. The route such signal takes is via the operated switch T1, operated switch H3, lead 355, switch CS1, lead 356, the tree input 357, the conditioned tree 350, the tract I lead, the switch finger 401, the rectangularly shaped contact of group 411, the leads 413 and 415 to shunt the relay SR. As the relay SR becomes shunted, it causes its related switches to restore. Switch SR2 is one of the restored switches and it follows that cycle institutions which have been caused thereby will cease. In the last such cycle, the record tape 29 is advanced so that the perforations following the tract I code are actively read seriatim in the manner hereinbefore stated, the switch SR4, as well as the switch SR3 having restored.

While the tract II is skip-read, the switch SR3 is held open by the skip-read relay SR, whereby during such time any automatic auto stop code recording is ineffectual to produce an effective signal over lead 372 to shunt the relay H to stop the reader 24. It will however be noted that any auto stop signal issued via the tree 350 over the auto stop lead 372 during the stated reading of tract I will be appropriately controlling to stop the reader.

When the tracts II are to be actively controlling but the tracts I are to be skip-read, the tract selector switch 400 is set to the tract II position. The switch fingers 401 and 402 then establish circuit conditions which produce generally reversed results in respect to the explanations which have preceded in regard to the tracts I and tracts II. By so appropriately setting the tract selector switch 400, it is possible to preselect certain portions of the record tape for transcriptive reading and to preselect other portions for skip-reading without causing any recording effect.

For preparing a control tape to include appropriately tract I and tract II code perforations where required, the master 20, see Figure 14b, has special keys marked "I" and "II," which if operated cause typeless dummy type actions to operate individually related coding slides 197 in the encoder 21, the appropriate code being responsively recorded by the tape punch 23. The said typeless dummy type actions have no effect on the escapement universal bar 55 and thus do not cause a feed of the carriage 35 of the master. Said keys "I," "II" may also be automatically under the control of the reader 24 sensing the appropriate code. Namely, whenever a signal issues via the tract I lead, a branch 421 thereof will operate a solenoid TI which is associated with the tract "I" key. Similarly, whenever a signal issues from the tree to the tract II lead then a solenoid TII becomes energized by a lead 422, such solenoid operating tract "II" key. This of course means that the tract codes sensed in the reader will become duplicated on the tape in the punch 23, providing the latter stands selected.

(29) Conclusion

The invention has been described in connection with the embodiment of the invention illustrated in the drawings but is not intended to be restricted thereto.

For example the writers may be of different construction and the code recording apparatus 23 may involve a principle of recording different from punching. For example, it may involve magnetic spot recording. Also the record medium need not necessarily be in the form of a tape. Variable numbers of either of the two kinds of recorders 20 and 23 may be used and of course the desired units of the apparatus may be connectable by gang plugs, not shown, but suitably provided. The keyboard for controlling the writers 20 and 22 and the code recorder 23 may be provided apart therefrom.

Many other modifications and variations are possible within the general range and scope of the invention and also various portions of the invention may be used without others.

What is claimed is:

1. An electromechanical encoder comprising a series of parallel, generally coextensive rocking blades, each blade having a pivot axis centrally of its width, means to support said blades to rock on their axes oppositely to stand individually either in an operated, coding position or a restored, non-coding position, a plurality of individually operable devices, each at operation thereof adapted to rock a distinct one or more of said blades to operated positions and concomitantly to restore such other blades as may have been standing operated, a pair of electrically connected switch fingers rockable by each blade and insulated therefrom, a dielectric plate arranged in a plane transversely to the series of rockable blades, the switch fingers of each pair pressing oppositely against the opposite flat sides of the dielectric plate resiliently with attendant friction, said dielectric plate having on one of its flat sides, flush therewith, contact areas individual to the switch fingers which on that side press thereagainst, said contact areas disposed so that rocking movement of each blade to and from its operated position will respectively glide such switch fingers thereonto and thereoff, said dielectric plate having on the other of its flat sides, contact area means with which the switch fingers at that side are continuously in contact, said switch fingers of each blade adapted to establish electrical bridges with their individually related contact areas and the contact area means at the other side of said dielectric plate and due to said attendant friction being instrumental to maintain each blade impositively and individually in the particular position to which it is rocked, pending a new operation of one of said devices, and means controlled by the operation of said cyclically operable means to open said electric current supply automatically after a brief current passage and pending a new operation of any of said devices.

2. The combination with an apparatus for producing codal recordings on a record medium and which apparatus includes means to feed the record medium to new positions for receipt of new recordings, of a series of members which are operable and restorable to stand either in an operated or in a restored position, an individual switch controlled by each member to close and to open respectively as each member is operated and restored, a plurality of devices operable selectively and including each means whereby the individual devices are adapted to operate distinct ones of said members and are adapted to restore such others as stood operated, a plurality of recording elements adapted for differential control by said switches to effect code position recordings, switch means independent of said switches and adapted to establish one or another electric route, means to control said switch means by said devices so that transitorily said one or said other electric route is established each time by a first operation of a device belonging respectively to one or another of two group classifications, means independent of said switches responsive to the transitory establishment of each one of said electric routes to transmit a transitory electrical signal causing the said recording elements to effect immediately a single recording operation which is distinctly representative of the group classification of the device which was instrumental to establish said route, and means to govern the electric potency of said switches in respect to said recording elements, comprising means to control at each operation of any of said devices the potency of said switches so that they may have transitory controlling effect on said recording elements timed to follow slightly after the operated device has had first an opportunity to act controllingly on said switch means to effect the recording operation representative of the established route, and comprising further means dependent on the transitory establishment of either one of said electric routes by said switch means to cause said switches to have such late timed controlling effect so that each instituted recording operation indicative of a transitorily established route will automatically and properly be followed by a code position recording effected under control of said switches, said switches being able in the event neither of said routes is transitorily established, to have said early timed controlling effect.

3. The combination with an apparatus for producing codal recordings on a record medium and which apparatus includes means to feed the record medium to new positions for receipt of new recordings, of a series of members which are operable and restorable to stand either in an operated or in a restored position, an individual switch controlled by each member to close and to open respectively as each member is operated and restored, a plurality of devices operable selectively and including each means whereby the individual devices are adapted to operate distinct ones of said members and are adapted to restore such others as stood operated, a plurality of code position recording elements adapted for differential control by said switches to effect code position recordings, switch means adapted to establish one or another electric route, means to control said switch means by said devices so that transitorily said one or said other electric route is established each time by a first operation of a device belonging respectively to one or another of two group classifications, means responsive to the transitory establishment of each one of said electric routes to cause the said recording elements to effect immediately a recording of distinct meaning, a first relay operated for a given period each time either of said two electric routes is established, a second relay, effective if operated to cause said switches to be electrically potent for controlling effect on the recording elements, means adapted in response to operations of any of said devices to cause the operation of said second relay for a controlled short time slightly after the operated device has concluded its movement, means to incapacitate the means to cause the operation of said second relay while said first relay is operated, thereby to cause said switches to be impotent while there may be effected either of said two recordings of distinct meaning, a device responsive to each operation of said first relay to store electric energy, and means to operate said second relay through discharge of energy thereto from said energy storing device at a given time after said first relay is operated.

4. The combination with an apparatus for producing codal recordings on a record medium and which apparatus includes means to feed the record medium to new positions for receipt of new recordings, of a series of members which are operable and restorable to stand either in an operated or in a restored position, an individual switch controlled by each member to close and to open respectively as each member is operated and restored, a plurality of devices operable selectively and including each means whereby the individual devices are adapted to operate distinct ones of said members and are adapted to restore such others as stood operated, a plurality of code position recording elements adapted for differential control by said switches to effect code position recordings, first switch means adapted to establish one or another electric route, means to control said switch means by said devices so that transitorily said one or said other electric route is established each time by a first operation of a device belonging respectively to one or another of two group classifications, means responsive to the transitory establishment of each one of said electric routes to cause the said recording elements to effect immediately a recording of distinct meaning, a normally open second switch means in series with all said switches to control their potency in respect to said recording elements, means including a relay, adapted to close said second switch means transitorily in accompaniment with each effected operation of any of said devices, but with a time delay permitting said first switch means to close earlier, a second relay operated through the establishment of either of said two electric routes, and means to cause a deferred operation of the said second switch means whenever an operation of said first switch means establishes transitorily either of said routes and causes the recording elements to effect a recording of either of said distinct meanings, said last means comprising a device to store energy in response to the operation of said second relay, means to drop said second relay after a given time interval, and means controlled by the dropping of said second relay to cause thereby said energy storing means to deliver with a given time delay an impulse of stored energy to said first relay, to cause thereby a delayed transitory operation of said second switch means.

5. The combination with an apparatus for producing codal recordings on a record medium and which apparatus includes means to feed the record medium to new positions for receipt of new recordings, of a series of members which are operable and restorable to stand either in an operated or in a restored position, an individual switch controlled by each member to close and to open respectively as each member is operated and restored, a plurality of devices operable selectively and including each means whereby the individual devices are adapted to operate distinct ones of said members and are adapted to restore such others as stood operated, said devices belonging each to one or another of two group classifications, a plurality of recording elements adapted for differential control by said switches to effect code position recordings, a single additional member operable between two opposite positions, means adapted to operate said additional member positively to its opposite positions respectively by first operations of said devices belonging respectively to said one or said other group classifications, switch means oppositely operable by the operation of said additional member to its opposite positions positively to establish transitorily one or another electric route, means independent of said switches, responsive to the transitory establishment of each one of said electric routes by said switch means to cause said recording elements to effect immediately a single occurrence recording representative of the group classification of the device which was instrumental to establish the electric route, and means to govern the controlling potency of said switches over said elements so that in response to each operation of a device which effects an operation of said additional member from one to its other opposite positions, the said switches become electrically potent for control of said elements with a certain time delay sufficient for said elements to effect first the single occurrence recording called for, and so that otherwise said switches will become controlling relatively immediately.

6. The combination with an apparatus for successively producing codal recordings on a record medium and which apparatus includes means to feed the record medium to new positions for receipt of new recordings, of a series of members which are operable and restorable to stand either in an operated or in a restored position, an individual switch controlled by each member to close and to open respectively as each member is operated and restored, a plurality of selectively operable devices, means operable by said devices and by being operated being adapted to operate distinct ones of said members and being adapted to restore such others as may have stood operated, said devices belonging each to one or another of two group classifications, a plurality of recording elements adapted for differential control by said switches to effect different code position recordings, switch means controlled by the devices of said one or said other of the two group classifications respectively to establish one or another electrical connection, means to control said switch means by said devices so that said one or said other electrical connection is established respectively each time by a first operation of a device belonging respectively to said one or said other of said two group classifications, means responsive to the establishment of said one or said other electrical connection to cause the said recording elements to effect immediately a distinctive single recording operation representative of the group to which the device operating the switch means belongs, means to govern the electric potency of said switches in respect to said recording elements, comprising means to control at each operation of any of said devices the potency of said switches so that they may have transitory controlling effect on said recording elements subsequently to the operated device having had an opportunity to act controllingly on said switch means, and comprising further means to cause said switches to have a delayed transitory controlling effect on said recording elements each time after either one of said electric connections becomes newly established by said switch means, a power supply switch for said apparatus adapted to be closed and opened, and means responsive to each closure of said power supply switch to pass a transitory signal over the prevailing electrical connection of said switch means and to cause said recording elements to effect the appropriate distinctive recording which is representative of the electrical connection which said switch means happens to afford.

7. In combination with an apparatus for producing codal recordings under the control of selectively operable devices, and which apparatus has differentially conditionable means whereby operations of said devices belonging to different classifications are adapted to control said apparatus in connection with each first operation of a device belonging to a certain classification to interpose a recording which is individually representative of such classification; a means settable to capacitate or to incapacitate said apparatus for response to said devices, and means responsive automatically to said settable means each time it is being set to capacitate said apparatus, to produce first in deference of the prevalent condition of said differentially conditionable means a recording representative of such condition.

8. In an apparatus system comprising a power operated typewriter, and a coded record producing apparatus; said typewriter comprising power-operable type actions, a letter-feeding carriage, a letter-feeding escapement normally in control of the carriage, and operation instituting elements associated with said power-operable type actions severally to cause them to function; an encoding device having coding elements adapted for power operations severally by said type actions to control said coded record producing apparatus, a device movable between an effective and an ineffective position respectively to hold said carriage stationary or to permit its movement, another device movable between an effective and an ineffective position respectively to foreshorten for non-printing effect the movements of said type actions or to permit full type movements thereof, and means to control said devices conjointly to reside either in their effective or ineffective positions.

9. In an apparatus system comprising a power operated typewriter, and a coded record producing apparatus; said typewriter comprising power-operable type actions, a letter-feeding carriage, a letter-feeding escapement normally in control of the carriage, a power carriage return means, means operable to render said carriage return means active, carriage controlled means to render the carriage return means automatically inactive, and operation instituting elements associated with said power-operable type actions and said operable means, severally to cause them to function; an encoding device having coding elements adapted for power operations severally by said type actions and also by said operable means, thereby to control said coded record producing apparatus, a device movable between an effective and an ineffective position respectively to hold said carriage stationary and further to incapacitate said operable means, or to permit its movement, another device movable between an effective and an ineffective position respectively to foreshorten for non-printing effect the movements of said type actions or to permit full type movements thereof, and means to control said devices conjointly to reside either in their effective or ineffective positions.

10. In an apparatus system comprising a power operated typewriter, and a coded record producing apparatus; said typewriter comprising power-operable type actions, a letter-feeding carriage, a letter-feeding escapement normally in control of the carriage, and operation instituting elements associated with said power-operable type actions severally to cause them to function; an encoding device having coding elements individually power-operable by said type actions, thereby to control said coded record producing apparatus, a device to impart a slight movement to the carriage counter to its letter-feed direction and then to hold it stationary, said device movable between an ineffective and an effective position, another device, movable between an effective and an ineffective position, respectively to foreshorten for non-printing effect the movements of said type actions or to permit full typing movements thereof, and means to control said devices conjointly to reside either in their effective or ineffective positions.

11. In an apparatus system comprising a power-operated typewriter, a record reader for sensing coded recordings from a record medium, and a coded record producing apparatus; said typewriter comprising power-operable type actions, a letter-feeding carriage, a letter-feeding escapement normally in control of the carriage, means to power-move the carriage impositively in at least one direction to gaged extents, and operation instituting elements associated with said power-operable type actions and said power-moving means, severally to cause them to function; decoding devices adapted to function under control of said record reader to operate said operation instituting elements, an encoding device adapted to respond to the power operations of said type actions and also incidental to operations of said power-moving means to control said coded record producing apparatus, a device movable between an effective and an ineffective position respectively to hold said carriage stationary or to permit its movement, another device movable between an effective and an ineffective position respectively to foreshorten for non-printing effect the movements of said type actions or to permit full typing movements thereof, and means to control said devices conjointly to reside either in their effective or ineffective positions.

12. In an apparatus system comprising a power operated typewriter, and a coded record producing apparatus; said typewriter comprising power-operable type actions, a letter-feeding carriage, a letter-feeding escapement normally in control of the carriage, a tabulating stop, a tabulating counterstop projectable into carriage movement controlling range of said tabulating stop, latch means whereby said counterstop remains projected pending engagement with said tabulating stop and then restores automatically, means to project transitorily said counterstop, and operation instituting elements associated individually with said power-operable type actions and said projecting means, severally to cause them to function; an encoding device variously adapted to respond to the power operations of said type actions and the projecting means to control said coded record producing apparatus, a device movable between an effective and an ineffective position respectively to hold said carriage stationary and further to release said latch means or to permit its movement, another device movable between an effective and an ineffective position respectively to foreshorten for non-printing effect the movements of said type actions or to permit full typing movements thereof, and means to control said devices conjointly to reside either in their effective or ineffective positions.

13. In an apparatus system comprising a power-operable master typewriter, a power-operable slave typewriter, a record reader for sensing coded recordings from a record medium, and a coded record producing apparatus; said typewriters comprising each power-operable type actions, a letter-feeding carriage, a letter-feeding escapement normally in control of the carriage, means to power-move the carriage impositively in at least one direction to a gaged extent and operation instituting elements associated with said power-operable type actions and said power-moving means, severally to cause them to function; solenoids individual to said elements on each typewriter to operate such elements, decoding devices adapted to function under control of said record reader to operate the solenoids of the master typewriter individually in a predetermined order, an encoding device comprising a coding member related to each one of said type actions of the master typewriter and comprising also a coding member related to said power-moving means, mechanical means whereby the type actions of the master typewriter operate their related coding members, a switch closeable by said power-moving means, a solenoid controlled by said switch to operate the coding member related to said power-moving means, switch elements individually operable by said coding members to close selecting circuits for the solenoids of the slave typewriter, means to incapacitate said master typewriter without incapacitating the slave typewriter, comprising means to hold the carriage of the master typewriter stationary and means to foreshorten for non-printing effect the movements of the type actions of the master typewriter, and means to incapacitate said slave typewriter comprising a switch to disable collectively the element operating solenoids of the slave.

14. The invention set forth in claim 13, said encoding device remote to the type actions of the master typewriter and comprising individual Bowden wire elements operable thereby to operate the related coding members.

15. In an apparatus system comprising a record reader for sensing coded recordings from a record medium, two typing machines and a coded record producing apparatus; each said typing machine comprising selectively operable typing means, a carriage, means to power move the carriage to a gaged extent, elements to cause selective operations of said typing means, an element operable to render said power moving means effective, means to render said power moving means ineffective automatically as it completes the gaged movement of the carriage, and individual solenoids to operate the said elements; decoding device associated with said record reader and under control of the latter adapted to issue selected signals causing duplicate operations of the solenoids in said typing machines, encoding means associated with said coded record producing apparatus and having individual coding members corresponding to said solenoids of each writing machine and operable through issuance of said selective signals, means operative under control of said members to cause the record producing apparatus to effect recordings representative of each issued selective signal, a switch related to the record reader and respectively by being operated and restored adapted to time respectively the sensing of the record medium and to time the issuance of each next selective signal by said decoding device, a relay to operate and restore said switch, switch means in circuit with said relay and normally causing it to be deenergized, means including universal bar means operated transitorily incidental to each operation of said members to control said switch means to energize said relay for a short time interval only, whereby incidental to each issuance of a selective signal by the decoding device said timing switch is operated long enough to prevent momentarily the issuance of a next signal, and means to prolong the operation of said relay for the combined duration which the said power moving means in both said typing machines are effective, whereby there is a delay in the issuance of a new selective signal while either of said power moving means is effective.

16. The invention set forth in claim 15, said universal bar inclusive means comprising a universal bar on one of the typing machines operable transitorily thereby, another universal bar operable by the coding member related to the power moving means, and a single operation device responsive to said other universal bar also to control said switch means.

17. In a machine system comprising at least a master typewriter and a slave typewriter, each typewriter having a case-shiftable body and a power case-shift mechanism including a lower case-shift instituting element and an upper case-shift instituting element, a solenoid for each one of said instituting elements of the slave, means to control said solenoids by opposite case-shift movements of the case-shiftable body of the master so that the case-shiftable body on the slave will automatically mimic the case-shift movements of the body on the master, said control means comprising on the master a single pole, double throw switch operable by the case-shift body to be thrown oppositely by opposite case-shift movements thereof, and an additional switch controlled by each opposite movement of the case-shift body of said master to send after the start of each movement an electric impulse to said single pole of said single pole, double throw switch, the existent position of said double throw switch before each operation determining an operation of the appropriate case-shift instituting element to cause the required mimicking movement.

18. In a machine system comprising at least a master typewriter and a slave typewriter, each typewriter having a typing mechanism and such mechanism in the slave typewriter being adapted to be responsive to such mechanism in the master to duplicate its operations, each typewriter having also a case-shiftable body, a power case-shift mechanism associated therewith and including a lower-case-shift instituting element and an upper-case-shift instituting element, a solenoid for each one of said instituting elements of the slave, means to control said solenoids by opposite case-shift movements of the case-shiftable body of the master so that the case-shiftable body on the slave will automatically mimic the case-shift movements of the body on the master, means to render the typing mechanism of the slave either responsive or non-responsive to the typing mechanism of the master typewriter and concomitantly thereto to render respectively the case-shift solenoids of said slave operative or inoperative, and switch means controlled by the case-shift body of said slave and arranged in the circuits of the said solenoids, to prevent in each instance unnecessary solenoid operations when the case-shift body of the master typewriter is being case-shifted but the case-shift body of the slave happens to be already in the required position.

19. In a machine system comprising at least a master typewriter and a slave typewriter, each typewriter having a case-shiftable body and a power case-shift mechanism including a lower case-shift instituting element and an upper case-shift instituting element, a solenoid for each one of said instituting elements of the slave and also of the master, a record tape reader, means to control said soneloids of said master and of said slave by signals adapted to be issued automatically by said tape reader, and also under control of opposite case-shift movements of the case-shiftable body of the master in a manner so that the case-shiftable body on the slave is adapted automatically to mimic the case-shift movements of the body on the master, said control means comprising on the master a single pole, double throw switch operable by the case-shift body to be thrown oppositely by opposite case-shift movements thereof, and an additional switch controlled by each opposite movement of the case-shift body of said master to send after the start of each movement an electric impulse to said single pole of said single pole, double throw switch, the existent position of said double throw switch before each operation determining an operation of the appropriate case-shift instituting element to cause the required mimicking movement of the case-shift body in the slave, said single pole, double throw switch in the event said case-shift body of the master is already in the position called for by a signal from the reader, being unable to pass an erroneous signal.

20. In combination with an apparatus system comprising at least one selectively operable printing recorder and a single record reader of the kind to sense seriatim successive position recordings from a record medium; some sensible position recordings variously representative of various character printing and other operations of which said recorder is capable, and a plurality of sensible position recordings having individual start-of-tract meaning; a tract selector device having a plurality of input leads of individual start-of-tract meaning and having two signal output means, means associated with said reader and adapted when the latter is operating, to issue seriatim individual signals, some to cause specific selective operations of said printing recorder and some individually to said input leads of the tract selector device, all in accord with successive position recordings being sensed in said reader, said tract selector device comprising means to connect electrically each of its input leads to either one of its signal output means, and means on one hand responsive to each signal which passes over one of said signal output means to cause the reader to sense seriatim recordings and to cause the signal issuing means to control said printing recorder in accord with the recordings being sensed, and on the other hand responsive to each signal which passes over said other output means to cause said reader to sense seriatim recordings and to cause said signal issuing means to become uncontrolling with respect to said printing recorder while nevertheless remaining controlling with respect to said input means of said tract selector device, said printing recorder becoming responsive to said signal issuing means again, responsive to a signal being passed over that lead of a start-of-tract meaning which by the tract selector device stands electrically connected with said one signal output means.

21. The invention set forth in claim 20, said responsive means including a relay which by signal output over one of said output means will operate and create a holding circuit for itself, and which by signal output over the other output means will drop said relay.

22. In combination with an apparatus system comprising at least one selectively operable printing recorder and a single record reader of the kind to sense seriatim successive position recordings from a record medium; some sensible position recordings representative of various character printing and other operations of which said recorder is capable, and two sensible position recordings having individual start-of-tract meaning; a tract selector device having two input leads of individual start-of-tract meaning and having two signal output means, means associated with said reader and adapted when the latter is operating, to issue seriatim signals, some to cause selective operations of said printing recorder and some individually to said input leads of the tract selector device, all in accord with successive position recordings being sensed in said reader, said tract selector device comprising means to connect electrically each of its input leads with said output means reversibly, means responsive to each signal by said issuing means to impart a record feeding operation to said reader, and means on one hand responsive to each signal which passes over one of said output means to cause the reader to sense a recording and further to cause the signal issuing means to control said printing recorder in accord with the recordings being sensed, and on the other hand responsive to each signal which passes over said other output means to cause said reader thereafter to sense seriatim recordings and to cause said signal issuing means to become uncontrolling with respect to said printing recorder while nevertheless remaining controlling with respect to said input means of said tract selector device, said printing recorder becoming responsive to said signal issuing means again, responsive to a signal being passed over that lead of a start-of-tract meaning which by the tract selector device stands electrically connected with said one signal output means.

23. In combination with an apparatus system comprising at least one selectively operable printing recorder and a single record reader of the kind to sense seriatim successive position recordings from a record medium; some sensible position recordings variously representative of various character printing and other operations of which said recorder is capable, and a plurality of sensible position recordings having individual start-of-tract meaning; a tract selector device having a plurality of input leads of individual start-of-tract meaning and having two signal output means, means associated with said reader and adapted when the latter is operating, to issue seriatim signals, some to cause selective operations of said printing recorder, and some individually to said input leads of said tract selector device, all in accord with successive position recordings being sensed in said reader, a third output means for said selector device, means responsive to each signal by said issuing means to feed the reader for sensing the next position recording, said tract selector device comprising means whereby said first two input leads may be connected electrically in series individually with the first two output means and in reversible relation thereto and whereby both of said input leads may be electrically connected with said third output means, and means on one hand responsive to each signal which passes over said one of said output means to cause the signal issuing means to control said printing recorder in accord with the recordings being sensed, and on the other hand responsive to each signal which passes over said other of said two output means to cause said reader thereafter to sense seriatim recordings and to cause said signal issuing means to become uncontrolling with respect to said printing recorder while nevertheless remaining controlling with respect to said input means of said tract selector device, said printing recorder becoming responsive to said signal issuing means again, responsive to a signal being passed over that lead of a start-of-tract meaning which by the tract selector device stands electrically connected with said one signal output means.

24. In combination with an apparatus system comprising at least one selectively operable printing recorder and a record reader of the kind to sense seriatim successive position recordings from a record medium; some sensible position recordings variously representative of various character printing and other operations of which said recorder is capable, and a plurality of sensible position recordings having individual start-of-tract meaning; a tract selector device having a plurality of input leads of individual start-of-tract meaning and having two signal output means, means associated with said reader and adapted when the latter is operating, to issue signals under control of said reader to cause selective seriatim operations of said printing recorder as well as signals to said input leads of the tract selector device, all in accord with successive position recordings being sensed in said reader, a third output means for said selector device, means responsive to each signal passed over said third output means to feed the reader for sensing the next position recording, said tract selector device comprising means whereby said first two input leads may be connected electrically in individual series with the first two output means and reversibly in relation thereto and whereby both of said input leads together may be connected with said third output means, means including a switch to incapacitate said reader feeding means against response to signals passed over said third output means and to disable said reader, and means on one hand responsive to each signal which passes over one of said first two output means to cause the reader to sense seriatim recordings and to cause the signal issuing means to control said printing recorder in accord with the recordings being sensed, and on the other hand responsive to each signal which passes over the other of said first two output means to cause said reader thereafter to sense seriatim recordings and to cause said signal issuing means to become uncontrolling with respect to said printing recorder while nevertheless remaining controlling with respect to said input means of said tract selector device, said printing recorder becoming responsive to said signal issuing means again, responsive to a signal being passed over that lead of a start-of-tract meaning which by the tract selector device stands electrically connected with said one signal output means.

25. In combination with an apparatus system comprising at least one selectively operable printing recorder and also a record reader of the kind to sense seriatim successive position recordings from a record medium; some sensible position recordings variously representative of various character printing and other operations of which said recorder is capable, and a plurality of sensible position recordings having individual start-of-tract meaning and at least one sensible position recording having a stop reader meaning; a tract selector device having a plurality of input leads of individual start-of-tract meaning and having also two signal output means, a reader stop means including a control lead receptive of signals to cause the reader to cease reading, means associated with said reader and adapted when the latter is operating, to issue signals under control of said reader to cause selective seriatim operations of said printing recorder, signals to said input leads of said tract selector device and signals to said control lead of the reader stop means, all in accord with successive position recordings being sensed in said reader, said tract selector device comprising means to connect electrically each of its input leads to either one of its signal output means, means on one hand responsive to each signal which passes over one of said output means to cause the reader to sense seriatim recordings and further to cause the signal issuing means to control said printing recorder in accord with the recordings being sensed, and on the other hand responsive to each signal which passes over said other output means to cause said reader thereafter to sense seriatim recordings and concomitantly to cause said signal issuing means to become uncontrolling with respect to said printing recorder while nevertheless remaining controlling with respect to said input means of said tract selector device, said printing recorder becoming responsive again to said signal issuing means when a signal is passed over that lead of a start-of-tract meaning which by the tract selector device stands electrically connected with said one signal output means, and means to incapacitate said reader stop means whenever due to a signal passing over the said other output means the signal issuing means becomes uncontrolling with respect to the printing recorder.

26. The combination with an apparatus for successively producing codal recordings on a record medium and which apparatus includes means to feed the record medium to new positions for receipt of new recordings, of a series of individually operable members, an individual switch associated with each said members and adapted to be closed by operation thereof, a plurality of selectively operable devices, means operable by said devices for coaction with said members so that upon operation of any of said devices distinct ones of said members are operated, said devices belonging each to one or another of two group classifications, a plurality of recording elements adapted for differential control by said switches to effect different code position recordings, switch means conditionable by first operations of any of said devices belonging respectively to said one or said other of said two group classifications to establish respectively one or another electrical connection, means responsive respectively to the establishment of said one or said other connection by said switching means to cause said recording elements to effect a distinct recording representative of the connection established, means to govern the electric potency of the switches in respect to said recording elements comprising means so that they will become controlling over said recording elements relatively immediately if the device being operated has no effect on the switch means but will become controlling with a given time delay if either one of said electric connections is newly established by said switch means, a power supply closing and opening provision for said recording apparatus, and means conditioned responsive to said provision each time it closes the power supply, to cause a transistory signal to pass over the connection which happens to stand established under control by said switch means and under control thereof to cause said recording elements to effect the particular distinct recording which is representative of such established connection.

27. In combination with an apparatus for producing codal recordings under the control of selectively operable devices and which apparatus has differentially conditionable means whereby operations of said devices belonging to different classifications are adapted to control said apparatus in connection with each first operation of a device belonging to a certain classification to interpose a recording which is individually representative of such classification; means manipulative to capacitate or to incapacitate said apparatus respectively for response and non-response to said devices, and means responsive automatically to said last means whenever it is manipulated to capacitate said apparatus, to produce a recording representative of and agreeingly with one of the conditions of said conditionable means.

References Cited in the file of this patent
UNITED STATES PATENTS

| | | |
|---|---|---|
| 2,199,541 | Harrison et al. | May 7, 1940 |
| 2,297,793 | Nichols et al. | Oct. 6, 1942 |
| 2,388,351 | Tholstrup | Nov. 6, 1945 |
| 2,540,030 | Hamilton et al. | Jan. 30, 1951 |
| 2,679,902 | Brewer | June 1, 1954 |
| 2,737,616 | Brewer | Mar. 6, 1956 |
| 2,739,649 | Happel et al. | Mar. 27, 1956 |
| 2,818,116 | Salmon et al. | Dec. 31, 1957 |
| 2,859,276 | Saykay | Nov. 4, 1958 |
| 2,882,972 | Salmon et al. | Apr. 21, 1959 |
| 2,902,092 | Hildebrandt | Sept. 1, 1959 |